United States Patent
Nagano et al.

(10) Patent No.: US 11,549,029 B2
(45) Date of Patent: Jan. 10, 2023

(54) AQUEOUS INK FOR INKJET RECORDING

(71) Applicant: KAO CORPORATION, Tokyo (JP)

(72) Inventors: Tomohiko Nagano, Izumiotsu (JP);
Teruyuki Fukuda, Wakayama (JP);
Takahiro Maeda, Wakayama (JP)

(73) Assignee: KAO CORPORATION, Tokyo (JP)

( * ) Notice: Subject to any disclaimer, the term of this patent is extended or adjusted under 35 U.S.C. 154(b) by 42 days.

(21) Appl. No.: 17/266,346

(22) PCT Filed: Jul. 26, 2019

(86) PCT No.: PCT/JP2019/029387
§ 371 (c)(1),
(2) Date: Feb. 5, 2021

(87) PCT Pub. No.: WO2020/031747
PCT Pub. Date: Feb. 13, 2020

(65) Prior Publication Data
US 2021/0309875 A1    Oct. 7, 2021

(30) Foreign Application Priority Data
Aug. 9, 2018  (JP) ............................. JP2018-150698

(51) Int. Cl.
C09D 11/322  (2014.01)
C09D 11/106  (2014.01)

(52) U.S. Cl.
CPC .......... C09D 11/322 (2013.01); C09D 11/106 (2013.01)

(58) Field of Classification Search
CPC ....... C09D 11/322; C09D 11/30; C09D 11/54; C09D 163/10; B41M 5/0023; B41M 5/0047; B41M 1/04; D06P 5/30
See application file for complete search history.

(56) References Cited

U.S. PATENT DOCUMENTS

| | | | |
|---|---|---|---|
| 7,008,994 B1 | 3/2006 | Waki | |
| 2004/0242726 A1 | 12/2004 | Waki et al. | |
| 2006/0098066 A1 | 5/2006 | Bauer | |
| 2006/0293410 A1 | 12/2006 | Tokita et al. | |
| 2008/0108746 A1* | 5/2008 | Waki | C09D 11/322 524/590 |
| 2009/0226679 A1 | 9/2009 | Yatake et al. | |
| 2009/0226682 A1 | 9/2009 | Yatake | |
| 2011/0032304 A1* | 2/2011 | Mozel | B41J 2/2107 524/556 |
| 2012/0046378 A1 | 2/2012 | Sloan | |
| 2012/0276028 A1 | 11/2012 | Kojima | |
| 2013/0106945 A1 | 5/2013 | Ikeda et al. | |
| 2013/0122310 A1 | 5/2013 | Tielemans et al. | |
| 2013/0177719 A1 | 7/2013 | Tasaka et al. | |
| 2013/0260114 A1 | 10/2013 | Saitou et al. | |
| 2014/0139595 A1 | 5/2014 | Hong et al. | |
| 2018/0118965 A1 | 5/2018 | Tabuchi et al. | |
| 2018/0142110 A1* | 5/2018 | Maeda | C09D 11/106 |
| 2018/0223119 A1 | 8/2018 | Oriakhi et al. | |
| 2018/0258200 A1 | 9/2018 | Matsumoto | |
| 2019/0382606 A1 | 12/2019 | Iraqi et al. | |
| 2020/0332137 A1* | 10/2020 | Kawata | B41M 5/0023 |
| 2021/0163765 A1* | 6/2021 | Ozaki | C09D 11/107 |

FOREIGN PATENT DOCUMENTS

| | | |
|---|---|---|
| CN | 103003328 A | 3/2013 |
| CN | 107922776 A | 4/2018 |
| EP | 1 086 975 A1 | 3/2001 |
| JP | 2000-7963 A | 1/2000 |
| JP | 2001-279151 A | 10/2001 |
| JP | 2002-121447 A | 4/2002 |
| JP | 2002-294133 A | 10/2002 |
| JP | 2005-225932 A | 8/2005 |
| JP | 2007-514809 A | 6/2007 |
| JP | 2011-121867 A | 6/2011 |

(Continued)

OTHER PUBLICATIONS

Extended European Search Report for European Application No. 19846670.8, dated Apr. 8, 2022.
Partial Supplementary European Search Report for European Application No. 19848427.1, dated Apr. 12, 2022.
Extended European Search Report for European Application No. 19848012.1, dated Mar. 30, 2022.
U.S. Appl. No. 17/266,389, filed Feb. 5, 2021, Not Yet Assigned.
U.S. Appl. No. 17/266,229, filed Feb. 5, 2021, Not Yet Assigned.
International Search Report (PCT/ISA/210) issued in PCT/JP2019/029387, dated Oct. 8, 2019.

(Continued)

Primary Examiner — John Zimmermann
(74) Attorney, Agent, or Firm — Birch, Stewart, Kolasch & Birch, LLP

(57) ABSTRACT

The present invention relates to [1] an aqueous composition for ink-jet printing containing a carbodiimide compound, a vinyl polymer and water, in which the vinyl polymer is dispersed in the aqueous composition in the form of polymer particles formed by partially neutralizing carboxy groups of the vinyl polymer with a basic compound having a boiling point of not higher than 130° C.; [2] an ink set for ink-jet printing containing an aqueous composition a containing a carbodiimide compound and water, and an aqueous composition b containing a vinyl polymer; and [3] an ink-jet printing method including the step 1 of ejecting a carbodiimide compound, a pigment, a vinyl polymer and water by an ink-jetting method to print characters or images, and the step 2 of subjecting the resulting printed characters or images to heat treatment at a temperature of 50 to 200° C. According to the aqueous composition of the present invention, it is possible to obtain a printed material that is excellent in rub fatness.

12 Claims, No Drawings

(56) References Cited

FOREIGN PATENT DOCUMENTS

| | | |
|---|---|---|
| JP | 2014-144578 A | 8/2014 |
| JP | 2015-36064 A | 4/2015 |
| JP | 2015-193788 A | 11/2015 |
| JP | 2016-505651 A | 2/2016 |
| JP | 2016-64574 A | 4/2016 |
| JP | 2017-101170 A | 6/2017 |
| JP | 2017-119799 A | 7/2017 |
| JP | 2017-165025 A | 9/2017 |
| JP | 2017-190369 A | 10/2017 |
| JP | 2018-70827 A | 5/2018 |
| JP | 2018-80255 A | 5/2018 |
| WO | WO 03/097753 A1 | 11/2003 |
| WO | WO 2012/042665 A1 | 4/2012 |
| WO | WO 2017/009601 A | 1/2017 |
| WO | WO 2018/138720 A1 | 8/2018 |

OTHER PUBLICATIONS

International Search Report, dated Sep. 24, 2019, for International Application No. PCT/JP2019/029385, with an English translation.
International Search Report, dated Sep. 24, 2019, for International Application No. PCT/JP2019/029386, with an English translation.
Extended European Search Report for corresponding European Application No. 19848427.1, dated Jul. 22, 2022.

\* cited by examiner

AQUEOUS INK FOR INKJET RECORDING

FIELD OF THE INVENTION

The present invention relates to an aqueous composition for ink-jet printing, an ink set for ink-jet printing, and an ink-jet printing method.

BACKGROUND OF THE INVENTION

From the viewpoint of improving water resistance and weathering resistance of a printed material, there has been proposed an ink using not a dye but a pigment as a colorant. However, when printing characters or images on a low-ink absorbing printing medium such as a coated paper or a resin film, etc., using such a pigment ink, pigment particles tend to remain on a surface of the printing medium after the printing. For this reason, there tends to occur such a problem that when any stimulus is applied to a surface of the printed material, the pigment particles are likely to be peeled off from the printing medium. To solve the problem, ultraviolet-curable inks (UV inks) have been proposed.

In ordinary UV inks, a pigment is dispersed in a monomer, and after printing characters or images using the inks, the monomer component contained in the inks is polymerized by irradiation of ultraviolet rays thereto, whereby it is possible to obtain a printed material having high image fastness. However, the UV inks have posed various problems such as poor working environments owing to peculiar odor of the monomer used or less safety owing to migration of the monomer or a polymerization initiator exuded from the printed material.

In consequence, in order to improve image fastness of the printed material obtained using a water-based pigment ink having high safety, there has been developed a water-based pigment ink containing a carbodiimide, or an aqueous composition such as a coating solution, etc., which can be used in combination with the ink.

For example, JP 2007-514809A (Patent Literature 1) aims at enhancing durability of images printed on a plain paper or a fabric or cloth, and discloses an ink-jet ink including a vehicle and a carbodiimide groups-containing component dispersed and/or dissolved in the vehicle, in which the ink contains an aqueous vehicle as the vehicle and a colorant dispersed in the aqueous vehicle with a polymer dispersant. In Examples of the Patent Literature 1, it is also described that a block copolymer constituted of methacrylic acid/benzyl methacrylate/ethyl triethylene glycol methacrylate as the polymer dispersant is neutralized with potassium hydroxide, and phenoxyethyl acrylate-g-ethoxy-triethylene glycol methacrylate-co-methacrylic acid is neutralized with N,N-dimethyl ethanolamine.

JP 2016-505651A (Patent Literature 2) aims at prolonging a shelf life of a self-crosslinking pigment ink, and discloses a dispersion containing a pigment, a polymer containing a carboxyl group, a crosslinking agent capable of undergoing a crosslinking reaction with the carboxyl group, an inhibition agent containing a tertiary amine and a liquid carrier, and an ink containing the dispersion. In Table II in Examples of the Patent Literature 2, it is described that the formulation prepared by mixing "Joncryl (registered trademark) HPD96" whose counter ion is ammonia, polycarbodiimide and water was a clear solution at a starting time of storage thereof at 60° C., but after the elapse of 2 weeks from the starting time of storage, a reaction between the mixed constitutional components has occurred to thereby cause aggregation of particles.

SUMMARY OF THE INVENTION

The present invention relates to an aqueous composition for ink-jet printing which contains a carbodiimide compound, a vinyl polymer and water, in which the vinyl polymer contains carboxy groups, and is dispersed in the aqueous composition in the form of polymer particles formed by partially neutralizing the carboxy groups with a basic compound having a boiling point of not higher than 130° C. as measured under atmospheric pressure.

DETAILED DESCRIPTION OF THE INVENTION

In the technologies described in the aforementioned Patent Literatures 1 and 2, when conducting the printing on a non-water absorbing printing medium such as a resin film, etc., the resulting printed material tends to be insufficient in rub fastness. Incidentally, the aqueous solution of "Joncryl (registered trademark) HPD96" described in the Patent Literature 2 is a clear solution in which the polymer is not dispersed in the form of particles.

Meanwhile, the ink-jet printing method is more suitable for production of a small number but many kinds of printed materials than analog printing methods such as a gravure printing method, etc., and therefore it has been demanded to apply the ink-jet printing method to a still wider range of printing media. With the increase in kinds of printing media to which the ink-jet printing method is applied, in the commercial or industrial printing application fields using printing media such as a coated paper or a resin film, it has been required that the resulting printed material is further improved, in particular, in rub fastness.

In addition, as a packaging substrate for containers used, for example, in food or medical application fields, such as a PET bottle and a plastic case, etc., there have been widely used heat-shrinkable resin films. Such a packaging substrate can be used for printing not only package designs, but also important information including product information such as statements of efficacy, usage, best-before date, lot number, etc., thereon. For this reason, it has also been required that even those printed materials using the heat-shrinkable resin films are improved in rub fastness.

The present invention relates to an aqueous composition for ink-jet printing which is capable of providing a printed material that is excellent in rub fastness, an ink set for ink-jet printing, and an ink-jet printing method.

The present inventors have found that an aqueous composition containing a carbodiimide compound and a vinyl polymer containing carboxy groups in which the vinyl polymer is dispersed in the form of polymer particles formed by partially neutralizing the carboxy groups with a specific basic compound is capable of improving rub fastness of a printed material obtained by inkjet printing.

That is, the present invention relates to the following aspects [1] to [3].
[1] An aqueous composition for ink-jet printing, containing a carbodiimide compound, a vinyl polymer and water, in which the vinyl polymer contains carboxy groups, and is dispersed in the aqueous composition in the form of polymer particles formed by partially neutralizing the carboxy groups with a basic compound having a boiling point of not higher than 130° C. as measured under atmospheric pressure.

[2] An ink set for ink-jet printing, containing an aqueous composition a containing a carbodiimide compound and water, and an aqueous composition b containing a vinyl polymer, in which the vinyl polymer contains carboxy groups, and is dispersed in the aqueous composition in the form of polymer particles formed by partially neutralizing the carboxy groups with a basic compound having a boiling point of not higher than 130° C. as measured under atmospheric pressure.

[3] An ink-jet printing method including the following steps 1 and 2:

Step 1: ejecting a carbodiimide compound, a pigment, a vinyl polymer and water onto a surface of a printing medium by an ink-jetting method to print characters or images thereon, said vinyl polymer containing carboxy groups, and being dispersed in an aqueous composition in the form of polymer particles formed by partially neutralizing the carboxy groups with a basic compound having a boiling point of not higher than 130° C. as measured under atmospheric pressure; and Step 2: subjecting the characters or images printed in the step 1 to heat treatment at a temperature of not lower than 50° C. and not higher than 200° C.

In accordance with the present invention, it is possible to provide an aqueous composition for ink-jet printing which is capable of providing a printed material that is excellent in rub fastness, an ink set for ink-jet printing, and an ink-jet printing method.

[Aqueous Composition for Ink-Jet Printing]

The first embodiment of the aqueous composition for ink-jet printing according to the present invention (hereinafter also referred to merely as an "aqueous composition") is an aqueous composition for ink-jet printing which contains a carbodiimide compound, a vinyl polymer and water, in which the vinyl polymer contains carboxy groups, and is dispersed in the aqueous composition in the form of polymer particles formed by partially neutralizing the carboxy groups with a basic compound having a boiling point of not higher than 130° C. as measured under atmospheric pressure.

In addition, the second embodiment of the present invention is a combination of an aqueous composition a containing the carbodiimide compound and water, and an aqueous composition b containing the vinyl polymer, in which the vinyl polymer contains carboxy groups, and is dispersed in the aqueous composition in the form of polymer particles formed by partially neutralizing the carboxy groups with the basic compound having a boiling point of not higher than 130° C. as measured under atmospheric pressure.

In the first embodiment of the present invention, by mixing the aqueous composition and a water-based ink containing a colorant on a surface of a printing medium or by further incorporating the colorant into the aqueous composition, it is possible to improve rub fastness of the resulting printed material.

In the second embodiment of the present invention, the colorant can be incorporated into at least one of the aqueous composition a and the aqueous composition b, and by mixing the aqueous composition a and the aqueous composition b on the surface of the printing medium, it is possible to improve rub fastness of the resulting printed material.

Meanwhile, the term "printing" as used in the present specification means a concept that includes printing or typing operation for printing characters or images, and the term "printed material" as used in the present specification means a concept that includes printed matters or typed materials on which characters or images are printed.

In addition, the term "aqueous" as used in the present specification means that water has a largest content among components of a medium contained in the aqueous composition.

The aqueous composition of the present invention is capable of providing a printed material that is excellent in rub fastness. The reason why the aforementioned advantageous effect can be attained by the present invention is considered as follows though it is not clearly determined yet.

That is, in general, upon conducting the ink-jet printing, after the ink is impacted onto a surface of a non-water absorbing printing medium such as a resin film, the colorant particles contained in the ink tend to remain adhered onto the surface of the printing medium without penetrating into the printing medium. In the present invention, it is considered that the carbodiimide compound and the vinyl polymer both contained in the aqueous composition in which the carboxy groups of the vinyl polymer are partially neutralized with the specific basic compound are subjected to crosslinking reaction with each other, so that a coating film of the ink having a firm crosslinked structure is formed on the printing medium. Since the carboxy groups of the vinyl polymer are neutralized with the basic compound having a boiling point of not higher than 130° C. as measured under atmospheric pressure, it is considered that the basic compound is volatilized when forming the coating film of the ink on the printing medium, so that the carboxy groups are transformed into an acid type, whereby it is possible to form the coating film of the ink which hardly suffers from swelling or dissolution with an alcohol, etc. Thus, it is considered that the colorant particles are fixed on the printing medium by the thus formed coating film of the ink, so that the resulting printed material can be improved in rub fastness.

<Carbodiimide Compound>

In the water-based ink of the present invention, by using the carbodiimide compound in combination with the carboxy group-containing vinyl polymer, it is possible to form a firm coating film of the water-based ink on the printing medium while maintaining storage stability of the water-based ink, so that the resulting printed material can be improved in rub fastness.

The carbodiimide compound is preferably a polycarbodiimide compound containing two or more carbodiimide groups in a molecule thereof. The polycarbodiimide compound is preferably a polymer containing carbodiimide groups (hereinafter also referred to merely as a "carbodiimide group-containing polymer").

The carbodiimide group equivalent of the carbodiimide group-containing polymer is preferably not less than 200, more preferably not less than 250 and even more preferably not less than 300 from the viewpoint of improving rub fastness of the resulting printed material, and is also preferably not more than 650, more preferably not more than 500, even more preferably not more than 400 and further even more preferably not more than 360 from the viewpoint of improving storage stability of the aqueous composition.

Incidentally, the carbodiimide group equivalent of the carbodiimide group-containing polymer as used herein means a mass of the carbodiimide group-containing polymer per 1 mol of the carbodiimide group.

The polycarbodiimide compound is preferably an aqueous polycarbodiimide compound from the viewpoint of improving reactivity, stability and handling properties thereof. The aqueous polycarbodiimide compound may be either water-soluble or water-dispersible. Examples of the aqueous polycarbodiimide compound include compounds containing a hydrophilic group at a terminal end thereof.

Such an aqueous polycarbodiimide compound may be produced by subjecting an organic diisocyanate compound to condensation reaction in association with decarboxylation (removal of carbon dioxide) to form an isocyanate-terminated polycarbodiimide, and then further adding a known hydrophilic segment containing a functional group having a reactivity with the isocyanate group to the isocyanate-terminated polycarbodiimide.

Examples of commercially available products of the carbodiimide group-containing polymer include "CARBODILITE E-02", "CARBODILITE E-03A", "CARBODILITE E-05", "CARBODILITE V-02", "CARBODILITE V-02-L2" and "CARBODILITE V-04" (tradenames) all available from Nisshinbo Chemical Inc., and the like <Vinyl Polymer>

The aqueous composition of the present invention contains the carboxy group-containing vinyl polymer as a resin containing a reactive group that is capable of undergoing crosslinking reaction with the carbodiimide compound from the viewpoint of improving rub fastness of the resulting printed material. In the carboxy group-containing vinyl polymer, the carboxy groups contained therein are partially neutralized with a basic compound having a boiling point of not higher than 130° C. as measured under atmospheric pressure, so that the vinyl polymer is dispersed in the aqueous composition in the form of polymer particles. The vinyl polymer may be either a water-soluble polymer or a water-insoluble polymer. However, from the viewpoint of improving rub fastness of the resulting printed material, the vinyl polymer is preferably a water-insoluble polymer.

The carboxy groups of the vinyl polymer partially undergo crosslinking reaction with the carbodiimide compound by conducting the heat treatment, so that the carboxy group-containing polymer even when the polymer is a water-soluble polymer is transformed into a water-insoluble polymer. Meanwhile, the vinyl polymer may be previously crosslinked using a crosslinking agent other than the carbodiimide compound before subjecting the vinyl polymer to the crosslinking reaction with the carbodiimide compound by the heat treatment. As such a crosslinking agent, there may be used the below-mentioned polyfunctional epoxy compound.

The water-insoluble polymer may be compounded in the ink in the form of the below-mentioned pigment-containing polymer particles or pigment-free water-insoluble polymer particles.

The "water-insoluble polymer" as used herein means a polymer exhibiting a solubility in water of 10 g or less, preferably 5 g or less and more preferably 1 g or less when the polymer is dried to a constant weight at 105° C. for 2 hours and then dissolved in 100 g of water at 25° C. The aforementioned solubility of the polymer means a solubility in water of the polymer whose carboxy groups are neutralized completely, i.e., 100%, with sodium hydroxide.

The aforementioned vinyl polymer is preferably a vinyl polymer that is produced by copolymerizing a monomer mixture containing an ionic monomer (a) (hereinafter also referred to merely as a "component (a)") and a hydrophobic monomer (b) (hereinafter also referred to merely as a "component (b)"), and preferably a monomer mixture further containing a hydrophilic nonionic monomer (c) (hereinafter also referred to merely as a "component (c)") in addition to the components (a) and (b) (such a mixture is hereinafter also referred to merely as a "monomer mixture").

The vinyl polymer contains a constitutional unit derived from the component (a) and a constitutional unit derived from the component (b). The vinyl polymer preferably further contains a constitutional unit derived from the hydrophilic nonionic monomer (c) in addition to the constitutional unit derived from the component (a) and the constitutional unit derived from the component (b).

(Ionic Monomer (a))

The ionic monomer (a) is preferably used as a monomer component of the vinyl polymer from the viewpoint of stably dispersing the polymer particles. Examples of the ionic monomer (a) include an anionic monomer and a cationic monomer. Among these ionic monomers, preferred is the anionic monomer.

As the anionic monomer, in view of the carboxy groups contained in the vinyl polymer, there may be used a carboxylic acid monomer. The carboxylic acid monomer may also be used in combination with a sulfonic acid monomer, a phosphoric acid monomer and the like.

Specific examples of the carboxylic acid monomer include acrylic acid, methacrylic acid, crotonic acid, itaconic acid, maleic acid, fumaric acid, citraconic acid, 2-methacryloyloxymethylsuccinic acid and the like.

Specific examples of the sulfonic acid monomer include styrenesulfonic acid, 2-acrylamido-2-methylpropanesulfonic acid, 3-sulfopropyl (meth)acrylate and the like.

Meanwhile, the "(meth)acrylate" as used herein means an acrylate and/or a methacrylate, and is also hereinlater defined in the same way.

Specific examples of the phosphoric acid monomer include vinylphosphonic acid, vinyl phosphate, bis(methacryloxyethyl) phosphate, diphenyl-2-acryloyloxyethyl phosphate, diphenyl-2-methacryloyloxyethyl phosphate and the like.

Among the aforementioned anionic monomers, from the viewpoint of improving dispersion stability of the anionic polymer particles in the water-based ink, preferred is the carboxylic acid monomer, more preferred are acrylic acid and methacrylic acid, and even more preferred is methacrylic acid.

(Hydrophobic Monomer (b))

The hydrophobic monomer (b) is used as a monomer component of the vinyl polymer from the viewpoint of improving dispersion stability of the polymer particles. Examples of the hydrophobic monomer (b) include at least one monomer selected from the group consisting of an alkyl (meth)acrylate, an aromatic group-containing monomer, a macromonomer, and the like. The preferred alkyl (meth) acrylate includes those alkyl (meth)acrylates containing an alkyl group having 1 to 22 carbon atoms and preferably 6 to 18 carbon atoms. Examples of the alkyl (meth)acrylates include methyl (meth)acrylate, ethyl (meth)acrylate, (iso) propyl (meth)acrylate, (is or tertiary)butyl (meth)acrylate, (iso)amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate, (iso)stearyl (meth)acrylate and the like.

Meanwhile, the terms "(iso- or tertiary-)" and "(iso)" as used herein mean both of the structure in which any of the groups expressed by "iso or tertiary" and "iso" is present, and the structure in which any of these groups is not present (i.e., normal).

The aromatic group-containing monomer is preferably a vinyl monomer containing an aromatic group having 6 to 22 carbon atoms which may contain a substituent group containing a hetero atom, and more preferably a styrene-based monomer or an aromatic group-containing (meth)acrylate. It is also preferred that the styrene-based monomer is used in combination with the aromatic group-containing (meth) acrylate.

Specific examples of the preferred styrene-based monomer include styrene, 2-methyl styrene and divinyl benzene. Among these styrene-based monomers, more preferred is styrene.

Also, specific examples of the preferred aromatic group-containing (meth)acrylate include benzyl (meth)acrylate, phenoxyethyl (meth)acrylate and the like. Among these aromatic group-containing (meth)acrylates, more preferred is benzyl (meth)acrylate.

The macromonomer is in the form of a compound containing a polymerizable functional group at one terminal end thereof and having a number-average molecular weight of from 500 to 100,000 and preferably from 1,000 to 10,000, and is used as a monomer component of the vinyl polymer from the viewpoint of improving dispersion stability of the polymer particles. The polymerizable functional group bonded to one terminal end of the macromonomer is preferably an acryloyloxy group or a methacryloyloxy group, and more preferably a methacryloyloxy group.

Meanwhile, the number-average molecular weight of the macromonomer may be measured by gel chromatography using chloroform containing 1 mmol/L of dodecyl dimethylamine as a solvent and using polystyrene as a reference standard substance.

As the macromonomer, from the viewpoint of improving dispersion stability of the polymer particles, there are preferably used an aromatic group-containing monomer-based macromonomer and a silicone-based macromonomer. Among these macromonomers, more preferred is the aromatic group-containing monomer-based macromonomer.

Examples of an aromatic group-containing monomer constituting the aromatic group-containing monomer-based macromonomer include the same aromatic group-containing monomers as described above. Among these aromatic group-containing monomers, preferred are styrene and benzyl (meth)acrylate, and more preferred is styrene.

Specific examples of the styrene-based macromonomer include "AS-6(S)", "AN-6(S)" and "HS-6(S)" (tradenames) all available from Toagosei Co., Ltd., and the like.

Examples of the silicone-based macromonomer include organopolysiloxanes containing a polymerizable functional group at one terminal end thereof, and the like.

(Hydrophilic Nonionic Monomer (c))

From the viewpoint of improving dispersion stability of the polymer particles, the vinyl polymer preferably further contains the hydrophilic nonionic monomer (c) as the monomer component thereof.

Examples of the hydrophilic nonionic monomer (c) include 2-hydroxyethyl (meth)acrylate, 3-hydroxypropyl (meth)acrylate, polyalkylene glycol (meth)acrylates such as polypropylene glycol (n=2 to wherein n represents an average molar number of addition of oxyalkylene groups: hereinafter defined in the same way) (meth)acrylate, etc., alkoxy polyalkylene glycol (meth)acrylates such as methoxy polyethylene glycol (n=1 to 30) (meth)acrylate, etc., phenoxy (ethylene glycol/propylene glycol copolymer) (n=1 to 30 in which n for ethylene glycol: 1 to 29) (meth)acrylate, and the like. Among these hydrophilic nonionic monomers (c), preferred are polypropylene glycol (meth)acrylate, methoxy polyethylene glycol (meth)acrylate and phenoxy (ethylene glycol/propylene glycol copolymer) (meth)acrylate, and also preferred is a combination of these (meth)acrylates.

Specific examples of commercially available products of the component (c) include "NK ESTER TM-20G", "NK ESTER TM-40G", "NK ESTER TM-90G" and "NK ESTER TM-230G" all available from Shin-Nakamura Chemical Co., Ltd.; and "BLEMMER PE-90", "BLEMMER PE-200", "BLEMMER PE-350", "BLEMMER PME-100", "BLEMMER PME-200", "BLEMMER PME-400" and the like, "BLEMMER PP-500", "BLEMMER PP-800" and the like, "BLEMMER AP-150", "BLEMMER AP-400", "BLEMMER AP-550" and the like, "BLEMMER 50PEP-300", "BLEMMER 50POEP-800B" and "BLEMMER 43PAPE-600B" (which all contain a hydroxy group) all available from NOF Corporation; and the like.

The aforementioned components (a) to (c) may be respectively used alone or in combination of any two or more thereof.

Upon production of the vinyl polymer, the contents of the aforementioned components (a) to (c) in the monomer mixture (contents of non-neutralized components; hereinafter defined in the same way) or the contents of the constitutional units derived from the components (a) to (c) in the vinyl polymer are as follows, from the viewpoint of improving dispersion stability of the polymer particles.

The content of the component (a) is preferably not less than 2% by mass, more preferably not less than 4% by mass and even more preferably not less than 5% by mass, and is also preferably not more than 40% by mass, more preferably not more than 35% by mass and even more preferably not more than 32% by mass.

The content of the component (b) is preferably not less than 30% by mass, more preferably not less than 40% by mass and even more preferably not less than 50% by mass, and is also preferably not more than 98% by mass, more preferably not more than 90% by mass and even more preferably not more than 80% by mass.

The content of the component (c) is not less than 0% by mass. In the case where the component (c) is further used in addition to the components (a) and (b), the content of the component (c) is preferably not less than 2% by mass, more preferably not less than 4% by mass and even more preferably not less than 6% by mass, and is also preferably not more than 40% by mass, more preferably not more than 30% by mass and even more preferably not more than 25% by mass.

In addition, in the case where the macromonomer is used as the component (b), the content of the macromonomer is preferably not less than 5% by mass, more preferably not less than 8% by mass and even more preferably not less than 10% by mass, and is also preferably not more than 50% by mass, more preferably not more than 40% by mass and even more preferably not more than 30% by mass.

In addition, the mass ratio of the component (a) to the component (b) [component (a)/component (b)] in the monomer mixture, i.e., the mass ratio of the constitutional unit derived from the ionic monomer (a) (in the case where two or more constitutional units derived from the ionic monomers (a) are present, it means a sum of these constitutional units) to the constitutional unit derived from the hydrophobic monomer (b) (in the case where two or more constitutional units derived from the hydrophobic monomers (b) are present, it means a sum of these constitutional units) [(a)/(b)], is preferably not less than 0.01, more preferably not less than 0.02 and even more preferably not less than 0.03, and is also preferably not more than 1.0, more preferably not more than 0.8 and even more preferably not more than 0.6.

<Production of Vinyl Polymer>

The vinyl polymer may be produced by copolymerizing the aforementioned monomer mixture by a known polymerization method. As the polymerization method, preferred is a solution polymerization method.

The solvent used in the solution polymerization method is not particularly limited, and as the solvent, there may be mentioned at least one polar organic solvent selected from the group consisting of aliphatic alcohols having not less than 1 and not more than 8 carbon atoms, ketones, ethers, esters and the like. Specific examples of the preferred solvent include aliphatic alcohols having 1 to 3 carbon atoms and ketones having 3 to 6 carbon atoms, such as methanol, ethanol, acetone, methyl ethyl ketone, methyl isobutyl ketone, etc. Of these solvents, more preferred is methyl ethyl ketone.

The polymerization may be carried out in the presence of a polymerization initiator or a polymerization chain transfer agent. As the polymerization initiator, preferred are azo compounds, and more preferred is 2,2'-azobis(2,4-dimethylvaleronitrile). As the polymerization chain transfer agent, preferred are mercaptans, and more preferred are 2-mercaptoethanol and 2-mercaptopropionic acid.

The preferred polymerization conditions may vary depending upon the kinds of polymerization initiators used, etc. The polymerization temperature is preferably not lower than 50° C. and more preferably not lower than 55° C., and is also preferably not higher than 90° C. and more preferably not higher than 85° C. The polymerization time is preferably not less than 1 hour and more preferably not less than 1.5 hours, and is also preferably not more than 20 hours and more preferably not more than hours. In addition, the atmosphere used in the polymerization is preferably a nitrogen gas atmosphere or an atmosphere of an inert gas such as argon, etc.

The vinyl polymer is preferably directly used in the form of a polymer solution as such without removing the solvent used in the polymerization reaction therefrom from the viewpoint of enhancing productivity of the water dispersion of the pigment-containing polymer particles.

The solid content of the thus obtained vinyl polymer solution is preferably not less than 15% by mass and more preferably not less than 18% by mass, and is also preferably not more than 60% by mass and more preferably not more than 50% by mass, from the viewpoint of enhancing productivity of the water dispersion of the pigment-containing polymer particles.

After completion of the polymerization reaction, the polymer thus produced may be isolated from the reaction solution by a known method such as reprecipitation, removal of the solvent by distillation, etc. The thus obtained polymer may also be subjected to reprecipitation, membrane separation, chromatography, extraction, etc., for removing unreacted monomers, etc., therefrom.

The acid value of the carboxy group-containing vinyl-polymer used in the present invention is not less than 50 mgKOH/g, preferably not less than 100 mgKOH/g and more preferably not less than 200 mgKOH/g, and is also preferably not more than 320 mgKOH/g, more preferably not more than 300 mgKOH/g and even more preferably not more than 270 mgKOH/g, from the viewpoint of improving dispersion properties of the vinyl-polymer. When the acid value of the carboxy group-containing vinyl-polymer lies within the aforementioned range, the amount of the carboxy groups in the vinyl polymer becomes sufficient.

The weight-average molecular weight of the vinyl polymer used in the present invention is preferably not less than 5,000, more preferably not less than 10,000 and even more preferably not less than 15,000, and is also preferably not more than 300,000, more preferably not more than 200,000, even more preferably not more than 100,000 and further even more preferably not more than 70,000, from the viewpoint of improving rub fastness of the resulting printed material.

Meanwhile, the acid value and the weight-average molecular weight may be measured by the respective methods described in Examples below.

As the vinyl polymer, there may be used commercially available products. Specific examples of commercially available products of the vinyl polymer include polyacrylic acids such as "ARON AC-10SL" available from Toagosei Co., Ltd., etc.; styrene-acrylic resins such as "JONCRYL 67", "JONCRYL 611", "JONCRYL 678", "JONCRYL 680", "JONCRYL 690" and "JONCRYL 819" all available from BASF Japan, Ltd., etc.; and the like.

(Neutralization)

The carboxy groups of the vinyl polymer are partially neutralized using the basic compound having a boiling point of not higher than 130° C. as measured under atmospheric pressure as a neutralizing agent.

The boiling point of the basic compound as measured under atmospheric pressure is preferably not higher than 120° C., more preferably not higher than 110° C. and even more preferably not higher than 100° C. from the viewpoint of improving rub fastness of the resulting printed material.

As the basic compound having a boiling point of not higher than 130° C. as measured under atmospheric pressure, there may be mentioned ammonia and an organic amine compound represented by the general formula of $R_3N$ wherein R is a hydrogen atom, a lower alkyl group, an amino lower alkyl group or an oxy lower alkyl group. Specific examples of such a volatile basic compound include trimethylamine, ethylamine, diethylamine, triethylamine, propylamine, isopropylamine, 3-methoxypropylamine, morpholine, N-methyl morpholine and the like.

Among these volatile basic compounds, from the viewpoint of exhibiting good volatility, etc., preferred are at least one compound selected from the group consisting of ammonia (boiling point (b.p.): −33.3° C.), trimethylamine (b.p.: 2.9° C.) and triethylamine (b.p.: 89° C.), and more preferred is ammonia.

The neutralization degree of the carboxy groups of the vinyl polymer is preferably not less than 10 mol %, more preferably not less than mol % and even more preferably not less than 30 mol %, and is also preferably less than 100 mol %, more preferably not more than 90 mol %, even more preferably not more than 80 mol % and further even more preferably not more than 75 mol %, from the viewpoint of improving rub fastness of the resulting printed material.

The neutralization degree as used herein may be determined as an equivalent of the neutralizing agent used on the basis of the carboxy groups of the vinyl polymer according to the following formula (1). When the equivalent of the neutralizing agent used is not more than 100 mol %, the equivalent of the neutralizing agent used has the same meaning as the neutralization degree of the carboxy groups of the vinyl polymer. On the other hand, when the equivalent of the neutralizing agent used exceeds 100 mol %, it means that the neutralizing agent is used in an excessively large amount relative to the carboxy groups of the vinyl polymer, and in such a case, the neutralization degree of the carboxy groups of the vinyl polymer is regarded as being 100 mol %.

Equivalent (mol %) of neutralizing agent used=
[{mass (g) of neutralizing agent added/equivalent of neutralizing agent}/[{weighted mean acid value (mgKOH/g) of vinyl polymer×mass (g) of vinyl polymer}/(56×1000)]]×100     (1).

The carboxy groups of the vinyl polymer according to the present invention partially undergo crosslinking reaction with the carbodiimide compound by conducting the heat treatment, so that the carboxy group-containing polymer even when the polymer is a water-soluble polymer is transformed into a water-insoluble polymer. The carboxy groups of the vinyl polymer may be previously crosslinked using a crosslinking agent other than the carbodiimide compound.

The crosslinking agent other than the carbodiimide compound is preferably the below-mentioned water-insoluble polyfunctional epoxy compound containing two or more epoxy groups in a molecule thereof, more preferably a compound containing two or more glycidyl ether groups in a molecule thereof, and even more preferably a polyglycidyl ether compound of a polyhydric alcohol containing not less than 3 and not more than 8 hydrocarbon groups in a molecule thereof.

The "water-insoluble" of the crosslinking agent as used herein means that when the crosslinking agent is dissolved in 100 g of ion-exchanged water at 25° C. until reaching a saturation concentration thereof, the solubility in water of the crosslinking agent is less than 50 g.

From the viewpoint of efficiently conducting the crosslinking reaction of the vinyl polymer with the crosslinking agent in a water-based medium, the water solubility rate of the crosslinking agent is preferably less than 50% by mass, more preferably not more than 40% by mass and even more preferably not more than 35% by mass. The "water solubility rate" of the crosslinking agent as used herein means a rate (% by mass) of dissolution of the crosslinking agent as measured by dissolving 10 parts by mass of the crosslinking agent in 90 parts by mass of water at 25° C. Suitable examples of the aforementioned crosslinking agent include at least one compound selected from the group consisting of polypropylene glycol diglycidyl ether, trimethylolpropane polyglycidyl ether and pentaerythritol polyglycidyl ether.

<Other Components>
(Colorant)

The aqueous composition of the present invention may also contain the below-mentioned colorant. As the colorant, from the viewpoint of improving water resistance of the resulting printed material, preferred is a pigment and a hydrophobic dye. Among these colorants, in order to allow the resulting printed material to exhibit high weathering resistance, the pigment is preferably used. The aqueous composition containing the colorant may also be used as the below-mentioned water-based ink.

(Fixing Aid Polymer (Ib))

The aqueous composition of the present invention may also contain the below-mentioned fixing aid polymer (Ib) in order to fix the colorant on a printing medium.

(Water-Soluble Organic Solvent)

The aqueous composition of the present invention preferably further contains a water-soluble organic solvent from the viewpoint of improving storage stability and ink-jet ejection properties of the aqueous composition as well as from the viewpoint of improving rub fastness of the resulting printed material by forming a smooth coating film of the ink thereon.

The "water-soluble organic solvent" as used herein means such an organic solvent whose solubility in water as measured by dissolving the organic solvent in 100 mL of water at 25° C. is not less than 10 mL.

The boiling point of the water-soluble organic solvent is preferably not lower than 150° C., more preferably not lower than 160° C., even more preferably not lower than 170° C. and further even more preferably not lower than 180° C., and is also preferably not higher than 250° C., more preferably not higher than 240° C. and even more preferably not higher than 230° C.

In the case where two or more water-soluble organic solvents are used in combination with each other as the water-soluble organic solvent, the boiling point of the water-soluble organic solvent means a weighted mean value of boiling points of the respective water-soluble organic solvents which are weighted by contents (% by mass) of the organic solvents.

Examples of the water-soluble organic solvent include a polyhydric alcohol, a polyhydric alcohol alkyl ether, a nitrogen-containing heterocyclic compound, an amide, an amine, a sulfur-containing compound and the like. Of these water-soluble organic solvents, from the viewpoint of improving ejection properties and storage stability of the aqueous composition as well as rub fastness of the resulting printed material, preferred is a polyhydric alcohol. The polyhydric alcohol may be used in the form of a mixed alcohol containing a plurality of compounds belonging to the concept of the polyhydric alcohol. A part of the polyhydric alcohol used herein may also be replaced with the polyhydric alcohol alkyl ether. In addition, when using the polyhydric alcohol alkyl ether as the water-soluble organic solvent, the polyhydric alcohol alkyl ether may be used in the form of a mixed polyhydric alcohol alkyl ether containing a plurality of compounds belonging to the concept of the polyhydric alcohol alkyl ether, similarly to the aforementioned polyhydric alcohol.

Examples of the polyhydric alcohol include ethylene glycol (boiling point (b.p.) 197° C.), propylene glycol (b.p. 188° C.), dipropylene glycol (b.p. 232° C.), polypropylene glycol, 1,3-propanediol (b.p. 210° C.), 2-methyl-1,3-propanediol (b.p. 214° C.), 1,2-butanediol (b.p. 192° C.), 1,3-butanediol (b.p. 208° C.), 1,4-butanediol (b.p. 230° C.), 3-methyl-1,3-butanediol (b.p. 203° C.), 1,5-pentanediol (b.p. 242° C.), 2-methyl-2,4-pentanediol (b.p. 196° C.), 1,2,6-hexanetriol (b.p. 178° C.), 1,2,4-butanetriol (b.p. 190° C.), 1,2,3-butanetriol (b.p. 175° C.), petriol (b.p. 216° C.) and the like. In addition, diethylene glycol (b.p. 244° C.), polyethylene glycol, 1,6-hexanediol (b.p. 250° C.), triethylene glycol (b.p. 285° C.), tripropylene glycol (b.p. 273° C.), glycerin (b.p. 290° C.) and the like may also be used in the present invention. These compounds having a boiling point higher than 240° C. are preferably used in combination with the aforementioned compounds having a boiling point lower than 240° C.

Examples of the polyhydric alcohol alkyl ether include alkylene glycol monoalkyl ethers, dialkylene glycol monoalkyl ethers, trialkylene glycol monoalkyl ethers and the like. Specific examples of the polyhydric alcohol alkyl ether include ethylene glycol monoethyl ether (b.p. 135° C.), ethylene glycol monobutyl ether (b.p. 171° C.), diethylene glycol monomethyl ether (b.p. 194° C.), diethylene glycol monoethyl ether (b.p. 202° C.), diethylene glycol monobutyl ether (b.p. 230° C.), triethylene glycol monomethyl ether (b.p. 122° C.), triethylene glycol monoisobutyl ether (b.p. 160° C.), tetraethylene glycol monomethyl ether (b.p. 158° C.), propylene glycol monoethyl ether (b.p. 133° C.), dipropylene glycol monomethyl ether (b.p. 190° C.), dipropylene glycol monobutyl ether (b.p. 227° C.), tripropylene glycol monomethyl ether (b.p. 243° C.), tripropylene glycol monobutyl ether and the like.

From the viewpoint of improving rub fastness of the resulting printed material, it is preferred that the water-soluble organic solvent contains the polyhydric alcohol. Among the polyhydric alcohols contained in the water-soluble organic solvent, more preferred are diols having not less than 3 and not more than 6 carbon atoms, even more preferred are diols having 3 or 4 carbon atoms, and further even more preferred is propylene glycol.

The content of the polyhydric alcohol in the water-soluble organic solvent is preferably not less than 60% by mass, more preferably not less than 80% by mass and even more preferably not less than 90% by mass.

(Contents of Respective Components in Aqueous Composition, Etc.)

The contents of the respective components in the aqueous composition are as follows from the viewpoint of improving storage stability of the aqueous composition as well as rub fastness of the resulting printed material.

The content of the carbodiimide compound in the aqueous composition is preferably not less than 0.1% by mass, more preferably not less than 0.3% by mass and even more preferably not less than 0.5% by mass, and is also preferably not more than 10% by mass, more preferably not more than 5% by mass and even more preferably not more than 3% by mass.

The content of the vinyl polymer in the aqueous composition is preferably not less than 0.5% by mass, more preferably not less than 1% by mass and even more preferably not less than 2% by mass, and is also preferably not more than 35% by mass, more preferably not more than 30% by mass and even more preferably not more than 25% by mass.

The mass ratio of the carbodiimide compound to the vinyl polymer (carbodiimide compound/vinyl polymer) is preferably not less than 0.01, more preferably not less than 0.05 and even more preferably not less than 0.1, and is also preferably not more than 1.0, more preferably not more than 0.7, even more preferably not more than 0.5 and further even more preferably not more than 0.4.

The content of the water-soluble organic solvent in the aqueous composition is preferably not less than 7% by mass, more preferably not less than 15% by mass and even more preferably not less than 25% by mass, and is also preferably not more than 50% by mass, more preferably not more than 45% by mass and even more preferably not more than 40% by mass.

The content of water in the aqueous composition is preferably not less than 20% by mass, more preferably not less than 25% by mass and even more preferably not less than 30% by mass, and is also preferably not more than 90% by mass, more preferably not more than 80% by mass, even more preferably not more than 70% by mass and further even more preferably not more than 60% by mass.

The content of the colorant in the aqueous composition is preferably not more than 1% by mass, more preferably not more than 0.1% by mass, even more preferably not more than 0.01% by mass and further even more preferably 0% by mass. If the aqueous composition contains substantially no colorant, the composition has no adverse influence on a hue of the water-based ink when printing characters or images using the aqueous composition in combination with the water-based ink.

The aqueous composition of the present invention may also contain various additives that may be usually used in a coating solution to be ejected by an ink-jetting method, etc., such as a dispersant, a surfactant, a viscosity modifier, a defoaming agent, an antiseptic agent, a mildew-proof agent, a rust preventive, and the like.

[Ink Set for Ink-Jet Printing]

The ink set for ink-jet printing according to the present invention (hereinafter also referred to merely as an "ink set") contains, as the aforementioned aqueous composition, an aqueous composition a containing the carbodiimide compound and water, and an aqueous composition b containing the vinyl polymer, in which the vinyl polymer contains carboxy groups, and is dispersed in the aqueous composition in the form of polymer particles formed by partially neutralizing the carboxy groups with the basic compound having a boiling point of not higher than 130° C. as measured under atmospheric pressure.

At least one of the aqueous composition a and the aqueous composition b, preferably the aqueous composition b, may further contain a colorant to allow the aqueous composition to act as a water-based ink containing the colorant.

The aforementioned ink set may be loaded, for example, into ink cartridges for respective colors in an ink-jet printing apparatus, so that (i) the respective ink cartridges are filled with the aqueous composition a containing the carbodiimide compound and water and the aqueous composition b containing the vinyl polymer, if required together with the colorant, which can be ejected in the form of ink droplets from respective ejection nozzles corresponding to the respective ink cartridges to print characters or images, or (ii) the respective ink cartridges are filled with the aqueous composition for ink-jet printing which contains the carbodiimide compound, the vinyl polymer and water, and the water-based ink containing the colorant, which can be ejected in the form of ink droplets from respective ejection nozzles corresponding to the respective ink cartridges to print characters or images.

As the water-based ink, a water-based ink having a single kind of hue may be used alone, or water-based inks having two or more kinds of hues may be used in combination with each other.

<Water-Based Ink>

[Colorant]

As the colorant of the water-based ink used in the present invention, from the viewpoint of improving water resistance of the resulting printed material, there are preferably used a pigment and a hydrophobic dye. Among these colorants, in order to allow the resulting printed material to exhibit high weathering resistance, the pigment is preferably used.

(Pigment)

The pigment used in the present invention may be either an inorganic pigment or an organic pigment, and may also be used in the form of a lake pigment or a fluorescent pigment. In addition, the inorganic or organic pigment may also be used in combination with an extender pigment, if required.

Specific examples of the inorganic pigment include carbon blacks, metal oxides such as titanium oxide, iron oxide, red iron oxide, chromium oxide, etc., iridescent nacreous pigments, and the like. In particular, the carbon blacks are preferably used for black inks. Examples of the carbon blacks include furnace blacks, thermal lamp blacks, acetylene blacks, channel blacks and the like.

Specific examples of the organic pigment include azo pigments such as azo lake pigments, insoluble monoazo pigments, insoluble disazo pigments, chelate azo pigments, etc.; polycyclic pigments such as phthalocyanine pigments, perylene pigments, perinone pigments, anthraquinone pigments, quinacridone pigments, dioxazine pigments, thioindigo pigments, isoindolinone pigments, quinophthalone pigments, diketopyrrolopyrrole pigments, benzimidazolone pigments, threne pigments, etc.; and the like.

The hue of the pigment is not particularly limited, and there may be used any of achromatic color pigments having a white color, a black color, a gray color, etc.; and chromatic color pigments having a yellow color, a magenta color, a cyan color, a blue color, a red color, an orange color, a green color, etc.

Specific examples of the preferred organic pigments include at least one pigment selected from the group consisting of C.I. Pigment Yellow 13, 17, 74, 83, 93, 97, 109, 110, 120, 128, 138, 139, 151, 154, 155, 174 and 180; C.I. Pigment Red 48, 57:1, 122, 146, 150, 176, 184, 185, 188, 202 and 254; C.I. Pigment Orange; C.I. Pigment Violet 19 and 23; C.I. Pigment Blue 15, 15:1, 15:2, 15:3, 15:4, 16 and 60; C.I. Pigment Green 7 and 36; and the like.

Examples of the extender pigment include silica, calcium carbonate, talc and the like.

The aforementioned pigments may be used alone or in the form of a mixture of any two or more thereof.

The pigment may be contained in the water-based ink in the form of a self-dispersible pigment, a pigment dispersed in the water-based ink with a polymer dispersant, or pigment-containing polymer particles.

(Hydrophobic Dye)

As the hydrophobic dye, there are preferably used those dyes that are capable of being included in the polymer particles. Examples of the hydrophobic dye include oil-soluble dyes, disperse dyes and the like. Among these dyes, preferred are oil-soluble dyes.

From the viewpoint of allowing the hydrophobic dye to efficiently become included in the water-insoluble polymer particles, the solubility of the hydrophobic dye in an organic solvent used upon production of a water dispersion of the polymer particles is preferably not less than 2 g/L and more preferably from 20 to 500 g/L.

The oil-soluble dye is not particularly limited. From the viewpoint of improving water resistance of the resulting printed material, examples of the oil-soluble dye include C.I. Solvent Black 3, 7, 27, 29, 34 and 45; C.I. Solvent Yellow 14, 16, 29, 56, 82 and 83:1; C.I. Solvent Red 1, 3, 8, 18, 24, 27, 43, 49, 51, 72 and 73; C.I. Solvent Violet 3; C.I. Solvent Blue 2, 4, 11, 44, 64 and 70; C.I. Solvent Green 3, 7 and 7; C.I. Solvent Orange 2; and the like. In addition, as the oil-soluble dye, there may also be used those dyes obtained by transforming a water-soluble dye into an oil-soluble one.

Among these hydrophobic dyes, preferred are C.I. Solvent Yellow 29 and 30 for a yellow colorant, C.I. Solvent Blue 70 for a cyan colorant, C.I. Solvent Red 18 and 49 for a magenta colorant, and C.I. Solvent Black 3 and 7 as well as nigrosine-based black dyes for a black colorant. These colorants may be used alone or in combination of any two or more thereof.

[Colorant Dispersing Polymer (Ia)]

As the colorant dispersing polymer (Ia) for dispersing the colorant, from the viewpoint of improving dispersibility of the colorant as well as rub fastness of the resulting printed material, there may be mentioned condensation-based resins such as polyester resins, polyurethane resins, etc.; vinyl-based resins that are obtained by addition-polymerizing a vinyl monomer (such as a vinyl compound, a vinylidene compound and a vinylene compound); and the like. Among these resins, preferred is at least one resin selected from the group consisting of the polyester resins and the vinyl-based resins, and more preferred are the vinyl-based resins. The colorant dispersing polymer (Ia) used herein may be either an appropriately synthetized product or a commercially available product. The colorant dispersing polymer (Ia) is preferably used in the form of a water dispersion thereof.

(Vinyl-Based Resin)

The vinyl-based resin preferably contains one or more constitutional units selected from the group consisting of a constitutional unit derived from an ionic monomer, a constitutional unit derived from a hydrophobic monomer and a constitutional unit derived from a hydrophilic nonionic monomer (hereinafter also referred to merely as a "nonionic monomer"), and more preferably two or more constitutional units selected from the group consisting of the aforementioned constitutional units. Examples of a combination of the monomers from which the two or more constitutional units of the vinyl-based resin are derived include a combination of the ionic monomer and the hydrophobic monomer, and a combination of the ionic monomer, the hydrophobic monomer and the nonionic monomer.

The vinyl-based resin may be produced, for example, by subjecting a monomer mixture containing the ionic monomer, the hydrophobic monomer and the nonionic monomer to addition polymerization by conventionally known methods.

As the vinyl-based resin used in the water-based ink, there may be used the same polymers as those vinyl polymers contained in the aqueous composition of the present invention.

(Polyester Resin)

The polyester resin may be used as the colorant dispersing polymer (Ia) by incorporating the polyester resin into the aforementioned aqueous composition.

The polyester resin may be produced by subjecting an alcohol component and a carboxylic acid component to polycondensation reaction.

The water dispersion of the polyester resin may be obtained by the method of adding the polyester resin to a water-based medium and then subjecting the resulting mixture to dispersion treatment using a disperser, etc., the method of gradually adding a water-based medium to the polyester resin to subject the resulting mixture to phase inversion emulsification, and the like. Among these methods, from the viewpoint of enhancing productivity of the water dispersion and improving dispersion stability of the polymer particles, the method using the phase inversion emulsification is preferably used. As the phase inversion emulsification method, there may be mentioned, for example, the method described in JP 2016-222896A. More specifically, there is preferably used such a method in which the polyester resin is first dissolved in an organic solvent, and then a water-based medium is added to the resulting solution to subject the solution to phase inversion emulsification, followed by removing the organic solvent therefrom. The water dispersion of the polyester resin may also contain a dispersant such as a surfactant, if required.

[Fixing Aid Polymer (Ib)]

The water-based ink used in the present invention may also contain a fixing aid polymer (Ib) for fixing the colorant on a printing medium.

The fixing aid polymer (Ib) is preferably used in the form of colorant-free polymer particles. As the component of the fixing aid polymer (Ib), there may be mentioned condensation-based resins such as polyurethane resins, polyester resins, etc.; and vinyl-based resins such as acrylic resins, styrene-based resins, styrene-acrylic resins, butadiene-based resins, styrene-butadiene-based resins, vinyl chloride-based resins, vinyl acetate-based resins, acrylic-silicone-based resins, etc. Among these resins, from the viewpoint of improving rub fastness and substrate adhesion properties of the resulting printed material, preferred are polyester resins and acrylic resins, and more preferred are vinyl-based resins.

In addition, from the viewpoint of enhancing productivity of the water-based ink, the fixing aid polymer (Ib) is preferably used in the form of a water dispersion containing the polymer particles. As the fixing aid polymer (Ib), there may be used either an appropriately synthetized product or a commercially available product.

Examples of the commercially available product of the fixing aid polymer (Ib) include polyester resins such as "elitel KA" series products and "elitel KZA" series product both available from UNITIKA, Ltd., etc.; polyurethane resins such as "WBR" series products available from Taisei Fine Chemical Co., Ltd., etc.; acrylic resins such as "Neocryl A-1127" available from DSM Coating Resins, Inc., "JONCRYL" series products available from BASF Japan, Ltd., etc.; styrene-butadiene resins such as "SR" series products available from Nippon A & L Inc., etc.; vinyl chloride-based resins such as "VINYBLAN" series products available from Nissin Chemical Co., Ltd., etc.; and the like.

The water-based ink preferably contains water-insoluble polymer particles containing the colorant, in particular, the pigment (hereinafter also referred to merely as "pigment-containing polymer particles") from the viewpoint of improving dispersion stability and ejection stability of the resulting ink. The pigment-containing polymer particles may have any configuration as long as the particles are formed of the pigment and the water-insoluble polymer.

<Production of Pigment-Containing Polymer Particles>

The polymer particles containing the pigment (pigment-containing polymer particles) can be efficiently produced in the form of a water dispersion thereof by the process including the following steps (1) and (2), and further including the step (3), if required.

Step (1): subjecting a mixture containing the vinyl polymer, the organic solvent, the pigment and water to dispersion treatment to obtain a dispersion of the pigment-containing polymer particles;

Step (2): removing the organic solvent from the dispersion obtained in the step (1) to obtain a water dispersion of the pigment-containing polymer particles; and Step (3): mixing the water dispersion of the pigment-containing polymer particles obtained in the step (2) and a crosslinking agent to subject the water dispersion to crosslinking treatment, thereby obtaining a water dispersion of the crosslinked polymer particles containing the pigment (hereinafter also referred to merely as "pigment-containing crosslinked polymer particles").

As described above, the pigment dispersing polymer used herein is preferably at least one resin selected from the group consisting of a polyester resin and a vinyl-based resin, and more preferably a vinyl-based resin. In the following, the case where the vinyl polymer is used as the pigment dispersing polymer is explained. However, the explanation can also be applied to the case using the polyester resin as the pigment dispersing polymer.

(Step (1))

The step (1) is the step of subjecting a mixture containing the vinyl polymer, the organic solvent, the pigment and water to dispersion treatment to obtain the dispersion of the pigment-containing polymer particles.

In the step (1), there is preferably used the method in which the vinyl polymer is first dissolved in the organic solvent, and then the pigment and water, if required, together with a neutralizing agent, a surfactant and the like, are added and mixed in the resulting organic solvent solution to obtain the dispersion of an oil-in-water type. The order of addition of the respective components to be added to the organic solvent solution of the vinyl polymer is not particularly limited, and it is however preferred that water, the neutralizing agent and the pigment are successively added in this order.

The organic solvent used for dissolving the vinyl polymer is not particularly limited. Examples of the organic solvent include aliphatic alcohols having 2 to 6 carbon atoms, ketones having 3 to 8 carbon atoms, ethers such as dibutyl ether, tetrahydrofuran, dioxane, etc., esters, and the like. Among these organic solvents, preferred are those organic solvents having 3 to 6 carbon atoms, and more preferred are ketones such as acetone, methyl ethyl ketone, methyl isobutyl ketone, etc.

When the vinyl polymer has been synthesized by the solution polymerization method, the organic solvent used in the polymerization may be directly used as such in the step (1).

(Neutralization)

The carboxy groups of the vinyl polymer are preferably partially neutralized using a neutralizing agent. The pH value of the resulting dispersion is preferably not less than 5.5 and more preferably not less than 6 from the viewpoint of improving handling properties of the dispersion such as suppression of skin irritation, etc., and is also preferably not more than 13, more preferably not more than 12 and even more preferably not more than 11 from the viewpoint of suppressing corrosion of members used upon the printing.

Examples of the neutralizing agent include basic compounds such as lithium hydroxide, sodium hydroxide, potassium hydroxide, ammonia, various amines and the like. Among these neutralizing agents, the aforementioned basic compounds having a boiling point of not higher than 130° C. as measured under atmospheric pressure are suitably used. The vinyl polymer may be previously neutralized. The neutralization degree of the carboxy groups of the vinyl polymer is preferably not less than 10 mol %, more preferably not less than 20 mol % and even more preferably not less than 30 mol %, and is also preferably not more than 300 mol %, more preferably not more than 200 mol % and even more preferably not more than 150 mol %, from the viewpoint of improving dispersion stability of the resulting dispersion.

The neutralization degree as used herein may be determined as an equivalent of the neutralizing agent used on the basis of the carboxy groups of the vinyl polymer according to the aforementioned formula (1).

The content of the pigment in the aforementioned mixture is preferably not less than 5% by mass and more preferably not less than 10% by mass, and is also preferably not more than 50% by mass and more preferably not more than 40% by mass.

The content of the vinyl polymer in the mixture is preferably not less than 2% by mass and more preferably not less than 3% by mass, and is also preferably not more than 40% by mass and more preferably not more than 20% by mass.

Also, the content of the organic solvent in the mixture is preferably not less than 10% by mass, and is also preferably not more than 70% by mass and more preferably not more than 50% by mass. The content of water in the mixture is preferably not less than 10% by mass and more preferably not less than 20% by mass, and is also preferably not more than 70% by mass.

The mass ratio of the content of the pigment to the content of the vinyl polymer [pigment/vinyl polymer] is preferably from 50/50 to 90/10 and more preferably from 60/40 to 80/20 from the viewpoint of improving dispersion stability of the resulting dispersion.

In the step (1), the method of dispersing the mixture is not particularly limited. The pigment-containing polymer particles may be atomized into fine particles having a desired average particle size only by substantial dispersion treatment. However, it is preferred that the mixture is first subjected to preliminary dispersion treatment, and then to the substantial dispersion treatment by applying a shear stress thereto so as to control the average particle size of the obtained pigment-containing polymer particles to a desired value.

The temperature used in the dispersion treatment in the step (1) is preferably not lower than 0° C., more preferably not lower than 5° C. and even more preferably not lower than 5° C., and is also preferably not higher than 40° C. and more preferably not higher than 30° C. The dispersing time is preferably not less than 1 hour and more preferably not less than 2 hours, and is also preferably not more than 30 hours and more preferably not more than 20 hours.

As the apparatus used upon subjecting the mixture to the preliminary dispersion treatment, there may be mentioned conventionally known mixing or stirring devices such as anchor blades, diaper blades, etc. Of these devices, preferred are high-speed stirring mixers.

As the apparatus used for applying a shear stress to the mixture in the substantial dispersion treatment, there may be mentioned kneading machines such as roll mills, kneaders, etc., high-pressure homogenizers such as "Microfluidizer" (tradename) available from Microfluidics Corporation, etc., and media-type dispersers such as paint shakers, beads mills, etc. These apparatuses may be used in combination with each other. Among these devices, the high-pressure homogenizers are preferably used from the viewpoint of reducing the particle size of the pigment-containing polymer particles.

The more preferred method of dispersing the mixture is such a method in which the mixture is subjected to the preliminary dispersion treatment using a disper and the like, followed by subjecting the resulting dispersion to the high-pressure dispersion treatment. The term "high-pressure dispersion" as used herein means that the dispersion treatment is conducted under a pressure of not less than 20 MPa.

The pressure used in the aforementioned dispersion treatment is preferably not less than 50 MPa, more preferably not less than 100 MPa and even more preferably not less than 120 MPa, and is also preferably not more than 250 MPa and more preferably not more than 200 MPa, from the viewpoint of reducing the particle size of the pigment-containing polymer particles and enhancing dispersion treatment efficiency.

(Step (2))

The step (2) is the step of removing the organic solvent from the dispersion obtained in the step (1) to obtain a water dispersion of the pigment-containing polymer particles.

The removal of the organic solvent may be conducted by conventionally known methods. The organic solvent is preferably substantially completely removed from the thus obtained water dispersion containing the pigment-containing polymer particles. However, the residual organic solvent may be present in the water dispersion unless the objects and advantageous effects of the present invention are adversely affected by the residual organic solvent. The content of the residual organic solvent in the water dispersion is preferably not more than 0.1% by mass and more preferably not more than 0.01% by mass.

If required, the dispersion may also be subjected to heating and stirring treatments before removing the organic solvent therefrom by distillation.

The temperature of the dispersion upon removing the organic solvent therefrom may be appropriately selected depending upon the kind of organic solvent to be removed.

The temperature of the dispersion upon removing the organic solvent therefrom under reduced pressure is preferably not lower than 20° C. and more preferably not lower than 30° C., and is also preferably not higher than 80° C. and more preferably not higher than 70° C.

The removal of the organic solvent from the dispersion is preferably conducted such that the concentration of non-volatile components (solid components) in the dispersion obtained after removing the organic solvent therefrom is preferably not less than 15% by mass and more preferably not less than 20% by mass, and is also preferably not more than 50% by mass, more preferably not more than 40% by mass and even more preferably not more than 35% by mass.

The solid content of the water dispersion may be measured by the method described in Examples below.

In the thus obtained water dispersion of the pigment-containing polymer particles, the solid components of the pigment-containing polymer particles having the aforementioned particle configuration are dispersed in a dispersing medium containing water as a main medium.

The average particle size of the pigment-containing polymer particles is preferably not less than 40 nm, more preferably not less than 50 nm and even more preferably not less than 60 nm, and is also preferably not more than 300 nm, more preferably not more than 250 nm, even more preferably not more than 200 nm and further even more preferably not more than 150 nm, from the viewpoint of improving rub fastness of the resulting printed material.

The average particle size of the pigment-containing polymer particles may be measured by the method described in Examples below.

(Step (3))

The step (3) is the step of mixing the water dispersion containing the pigment-containing polymer particles which has been obtained in the step (2) and a crosslinking agent to subject the water dispersion to crosslinking treatment, thereby obtaining a water dispersion containing the pigment-containing crosslinked polymer particles. The step (3) is an optional step.

By conducting the step (3), the carboxy groups contained in the vinyl polymer constituting the pigment-containing polymer particles are at least partially subjected to crosslinking reaction, so that the vinyl polymer is transformed into a crosslinked polymer.

In addition, when compounding the resulting water dispersion in the ink, the vinyl polymer is prevented from suffering from swelling with the organic solvent, so that it is possible to improve rub fastness of the resulting printed material.

As the method of subjecting the water dispersion to the crosslinking treatment, there may be mentioned the method in which the mixture of the aforementioned water dispersion and the crosslinking agent is reacted while stirring at a temperature of not lower than 60° C. and preferably not lower than 65° C.

The crosslinking gent is preferably a water-insoluble polyfunctional epoxy compound containing two or more epoxy groups in a molecule thereof. The crosslinking gent is more preferably a compound containing two or more glycidyl ether groups in a molecule thereof, and even more preferably a polyglycidyl ether compound of a polyhydric alcohol containing not less than 3 and not more than 8 hydrocarbon groups in a molecule thereof.

The "water-insoluble" of the crosslinking agent as used herein means that when the crosslinking agent is dissolved in 100 g of ion-exchanged water at 25° C. until reaching a saturation concentration thereof, the solubility in water of the crosslinking agent is less than 50 g. The solubility in water of the crosslinking agent is preferably not more than 40 g and more preferably not more than 35 g.

From the viewpoint of efficiently conducting the crosslinking reaction of the polymer in a water-based medium, the water solubility rate of the crosslinking agent is preferably less than 50% by mass, more preferably not more than 40% by mass and even more preferably not more than 35% by mass. The "water solubility rate" of the crosslinking agent as used herein means a rate (% by mass) of dissolution of the crosslinking agent as measured by dissolving 10 parts by mass of the crosslinking agent in 90 parts by mass of water at room temperature (25° C.).

The molecular weight of the crosslinking agent is preferably not less than 120, more preferably not less than 150 and even more preferably not less than 200, and is also preferably not more than 2000, more preferably not more than 1500 and even more preferably not more than 1000, from the viewpoint of facilitating the crosslinking reaction.

The epoxy equivalent (g/eq) of the crosslinking agent is preferably not less than 90, more preferably not less than 100 and even more preferably not less than 110, and is also preferably not more than 300, more preferably not more than 200 and even more preferably not more than 150.

Meanwhile, the water solubility rate and the epoxy equivalent of the epoxy compound may be measured by the respective methods described in Examples below.

Specific examples of the crosslinking agent include polyglycidyl ethers such as polypropylene glycol diglycidyl ether, glycerol polyglycidyl ether, polyglycerol polyglycidyl ether, trimethylolpropane polyglycidyl ether, sorbitol polyglycidyl ether, pentaerythritol polyglycidyl ether, resorcinol diglycidyl ether, neopentyl glycol diglycidyl ether, 1,6-hexanediol diglycidyl ether, hydrogenated bisphenol A-type diglycidyl ethers, etc., and the like. Of these crosslinking agents, preferred is at least one compound selected from the group consisting of polypropylene glycol diglycidyl ether (water solubility rate: 31% by mass), trimethylolpropane polyglycidyl ether (water solubility rate: 27% by mass) and pentaerythritol polyglycidyl ether (water solubility rate: 0% by mass).

Examples of commercially available products of the water-insoluble polyfunctional epoxy compound include "DENACOL EX" series products available from Nagase ChemteX Corporation and "EPIOL BE" series products and "EPIOL B" series products both available from NOF Corporation, and the like.

From the viewpoint of improving rub fastness of the resulting printed material, the amount of the crosslinking agent, in particular, the water-insoluble polyfunctional epoxy compound, used in the crosslinking reaction may be controlled to such an amount as to react with preferably not less than 0.1 mmol, more preferably not less than 0.3 mmol and even more preferably not less than 0.5 mmol of an ionic group of the vinyl polymer as calculated in terms of an amount of the ionic group per 1 g of the vinyl polymer, and may also be controlled to such an amount as to react with preferably not more than 20 mmol, more preferably not more than 15 mmol, even more preferably not more than 10 mmol, further even more preferably not more than 5 mmol and still further even more preferably not more than 1.0 mmol of the ionic group of the vinyl polymer as calculated in terms of an amount of the ionic group per 1 g of the vinyl polymer.

The pigment-containing crosslinked polymer particles obtained by the aforementioned crosslinking treatment preferably contain the ionic group neutralized with the base in an amount of not less than 0.3 mmol and more preferably not less than 0.5 mmol per 1 g of the polymer, and also preferably not more than 1.5 mmol per 1 g of the polymer.

The crosslinking rate of the pigment-containing polymer particles is preferably not less than 10 mol %, more preferably not less than 20 mol % and even more preferably not less than 30 mol %, and is also preferably not more than 80 mol %, more preferably not more than 60 mol % and even more preferably not more than 50 mol %.

The aforementioned crosslinking rate is the value obtained by dividing the number of moles of the reactive group of the crosslinking agent by the number of moles of a reactive group (carboxy group) contained in the pigment-containing polymer particles which can be reacted with the crosslinking agent.

(Contents of Respective Components in Water-Based Ink)

The contents of the respective components in the water-based ink are as follows.

The content of the colorant, in particular, the pigment in the ink is preferably not less than 1% by mass, more preferably not less than 2% by mass and even more preferably not less than 3% by mass from the viewpoint of enhancing optical density of the resulting printed material, and is also preferably not more than 15% by mass, more preferably not more than 10% by mass, even more preferably not more than 8% by mass and further even more preferably not more than 6% by mass from the viewpoint of improving rub fastness of the resulting printed material.

The content of water in the ink is preferably not less than 30% by mass, more preferably not less than 40% by mass and even more preferably not less than 50% by mass, and is also preferably not more than 80% by mass, more preferably not more than 75% by mass and even more preferably not more than 70% by mass, from the viewpoint of improving rub fastness of the resulting printed material.

In the case where the water-based ink contains the organic solvent, the content of the organic solvent in the ink is preferably not less than 5% by mass, more preferably not less than 10% by mass and even more preferably not less than 20% by mass, and is also preferably not more than 60% by mass, more preferably not more than 50% by mass and even more preferably not more than 40% by mass, from the viewpoint of improving ejection properties of the resulting ink as well as rub fastness of the resulting printed material.

[Ink-Jet Printing Method]

From the viewpoint of improving rub fastness of the resulting printed material, the ink-jet printing method of the present invention includes the following steps 1 and 2.

Step 1: ejecting the carbodiimide compound, the pigment, the vinyl polymer and water onto a surface of a printing medium by an ink-jetting method to print characters or images thereon, said vinyl polymer containing carboxy groups, and being dispersed in an aqueous composition in the form of polymer particles formed by partially neutralizing the carboxy groups with the basic compound having a boiling point of not higher than 130° C. as measured under atmospheric pressure; and Step 2: subjecting the characters or images printed in the step 1 to heat treatment at a temperature of not lower than 50° C. and not higher than 200° C.

(Step 1)

The step 1 is the step of ejecting the carbodiimide compound, the pigment, the vinyl polymer and water onto the surface of the printing medium by an ink-jetting method to print characters or images thereon.

The step 1 preferably further includes the step 1a of ejecting the water-based ink onto the printing medium by an ink-jetting method, and the step 1b of ejecting the aqueous composition onto the printing medium by an ink-jetting method. It is more preferred that the step 1a is conducted before or simultaneously with the step 1b, and it is even more preferred that the step Ia is conducted before the step 1b.

By conducting the step 1a before the step 1b, it is possible to more effectively obtain a printed material that is excellent in rub fastness. In this case, the elapsed time period from the time at which the water-based ink is applied to the printing medium to the time at which the aqueous composition is applied to the printing medium is not particularly limited.

The colorant may be incorporated in the water-based ink, the carbodiimide compound may be incorporated in at least one of the water-based ink and the aqueous composition, and the vinyl polymer may also be incorporated in at least one of the water-based ink and the aqueous composition. Among these combinations of the water-based ink and the aqueous composition, preferred are a combination of the aqueous composition containing the carbodiimide compound and the water-based ink containing the vinyl polymer, and a combination of the aqueous composition containing the carbodiimide compound and the vinyl polymer, and the water-based ink.

The ink-jetting method of ejecting the aqueous composition and the water-based ink is preferably a piezoelectric method from the viewpoint of improving ejection properties thereof.

The amount of the aqueous composition applied onto the printing medium in terms of a solid content thereof is preferably not less than 0.1 g/ms, more preferably not less than 0.75 g/m$^2$ and even more preferably not less than 1.5 g/m$^2$, and is also preferably not more than 5.0 g/m$^2$, more preferably not more than 3.5 g/m$^2$ and even more preferably not more than 2.0 g/m$^2$, from the viewpoint of improving rub fastness of the resulting printed material.

The amount of the water-based ink applied onto the printing medium in terms of a solid content thereof is preferably not less than 0.5 g/m$^2$, more preferably not less than 1.5 g/m$^2$ and even more preferably not less than 2.0 g/m$^2$, and is also preferably not more than 10 g/m$^2$, more preferably not more than 7.5 g/m$^2$ and even more preferably not more than 5.0 g/m$^2$, from the viewpoint of improving rub fastness of the resulting printed material.

(Step 2)

The step 2 is the step of subjecting the characters or images printed in the step 1 to heat treatment at a temperature of not lower than 50° C. and not higher than 200° C. By conducting the step 2, it is possible to form a firm coating film of the ink. The crosslinking reaction is preferably conducted by subjecting the printing medium on which the characters or images are printed to the heat treatment.

The method of conducting the heat treatment is not particularly limited. The heat treatment may be conducted by (i) a method of applying a hot air to the surface of the printing medium to heat the printed characters or images formed thereon, (ii) a method of approaching a heater to the surface of the printing medium to heat the printed characters or images formed thereon, (iii) a method of bringing a heater into contact with a surface of the printing medium opposed to its surface on which the printed characters or images are formed, to heat the printed characters or images, (iv) a method of heating the surface of the printed characters or images formed on the printing medium by steam curing using a high-temperature steam under ordinary pressure or under elevated pressure, and the like.

The heating temperature is preferably not lower than 90° C., more preferably not lower than 100° C. and even more preferably not lower than 110° C., and is also preferably not higher than 200° C., more preferably not higher than 170° C. and even more preferably not higher than 150° C. In the case where a shrink film is used as the printing medium, by heating the shrink film that is kept in such a state as attached to an aimed object, it is possible to conduct the crosslinking reaction of the printed characters or images and adhesion of the shrink film to the object by shrinkage thereof at the same time only during the single step.

The heating time is preferably not less than 1 minute, more preferably not less than 3 minutes and even more preferably not less than 5 minutes, and is also preferably not more than 30 minutes, more preferably not more than 20 minutes and even more preferably not more than 15 minutes.

Furthermore, it is preferred that before conducting the step 2, the step of drying the printed characters or images obtained in the step 1 is conducted. In the drying step, the crosslinking reactions between the carbodiimide compound and the polyester resin and between these compounds and the other resin(s) are allowed to proceed, so that the printed characters or images can be efficiently subjected to crosslinking reaction in a stepwise manner.

The drying temperature is preferably not lower than 30° C. and more preferably not lower than 40° C., and is also preferably lower than 100° C., more preferably not higher than 80° C. and even more preferably not higher than 60° C. In the case where the drying temperature is not lower than 50° C., the drying treatment also acts as the aforementioned heat treatment.

The drying time is preferably not less than 1 minute and more preferably not less than 2 minutes, and is also preferably not more than 20 minutes, more preferably not more than 10 minutes and even more preferably not more than 5 minutes.

The printing medium used in the ink-jet printing method of the present invention is not particularly limited.

Examples of the printing medium used herein include a high-water absorbing plain paper, a low-water absorbing coated paper and a low-water absorbing resin film. Among these printing media, from the viewpoint of improving commercial or industrial printing capability, preferred are a low-water absorbing coated paper and a low-water absorbing resin film, and more preferred is a low-water absorbing resin film.

The term "low-water absorbing" of the printing medium as used herein means a concept including both of low-water absorbing properties and non-water absorbing properties of the printing medium against water and/or the ink, and the "low-water absorbing" may be evaluated by absorption of pure water to the printing medium. More specifically, the "low-water absorbing" means that the water absorption of the printing medium as measured by contacting the printing medium with pure water for 100 milliseconds is not less than 0 g/m$^2$ and not more than 10 g/m$^2$, and preferably not less than 0 g/m$^2$ and not more than 6 g/m$^2$.

Specific examples of the coated paper include a versatile glossy coated paper, a multi-color foam glossy coated paper, and the like.

As the resin film, preferred is at least one film selected from the group consisting of a polyester film, a polyvinyl chloride film, a polypropylene film and a polyethylene film. The surface of the resin film on which the printed characters or images are to be formed may be subjected to corona treatment.

Specific examples of commercially available products of the resin film include "LUMIRROR T60" (polyester) available from Toray Industries Inc., "PVC80B P" (polyvinyl chloride) available from Lintec Corporation, "KINATH KEE 70CA" (polyethylene) available from Lintec Corporation, "YUPO SG90 PAT" (polypropylene) available from Lintec Corporation, "FOR" and "FOA" (polypropylene) both available from Futamura Chemical Co, Ltd., "BONYL RX" (nylon) available from Kohjin Film & Chemicals Co., Ltd., "EMBLEM ONBC" (nylon) available from UNITIKA Ltd., and the like.

Examples of the shrink film that undergoes shrinkage upon heating include films formed of at least one thermoplastic resin selected from the group consisting of polyester-based resins; styrene-based resins such as polystyrene, a styrene-butadiene copolymer, etc.; polylactic acids; olefin-based resins such as polyethylene, polypropylene, etc.; vinyl chloride-based resins; a mixture of any two or more of these resins; and the like, as well as a laminated film of these films.

Specific examples of commercially available products of the shrink film include "SPACECLEAN S7042" available from TOYOBO Co., Ltd.; "DXL" series products, "HISHIPET" series products, "PLABIO" series products and "HYBREX DL" series products all available from Mitsubishi Chemical Corporation; "BONSET" series products available from C.I. TAKIRON Corporation; "FANCYWRAP PET" series products available from GUNZE Ltd.; and the like.

EXAMPLES

In the following Preparation Examples, Examples and Comparative Examples, the "part(s)" and "%" indicate "part(s) by mass" and "% by mass", respectively, unless otherwise specified. The properties of the polymers, etc., were measured by the following methods.

(1) Measurement of Weight-Average Molecular Weight of Polymer

The weight-average molecular weight of the polymer was measured by gel chromatography [GPC apparatus: "HLC-83200PC" available from Tosoh Corporation; columns: "TSKgel Super AWM-H", "TSKgel Super AW3000" and "TSKgel guard column Super AW-H" all available from Tosoh Corporation; flow rate: 0.5 mL/min] using a solution prepared by dissolving phosphoric acid and lithium bromide in N,N-dimethylformamide such that concentrations of phosphoric acid and lithium bromide in the resulting solution were 60 mmol/L and 50 mmol/L, respectively, as an eluent, and using kits of monodisperse polystyrenes having previously known molecular weights [PStQuick B(F-550, F-80, F-10, F-1, A-1000), PStQuick C(F-288, F-40, F-4, A-5000, A-500] all available from Tosoh Corporation as a reference standard substance.

As a sample to be measured, there was used a dispersion prepared by mixing 0.1 g of the resin with 10 mL of the aforementioned eluent in a glass vial, stirring the resulting mixture with a magnetic stirrer at 25° C. for 10 hours, and then subjecting the mixture to filtration treatment through a syringe filter "DISMIC-13HP PTFE" (0.2 μm) available from Advantec Co., Ltd.

(2) Measurement of Acid Value of Polymer

In an automatic potentiometric titrator (power burette; "Model No.: APB-610") available from Kyoto Electronics Manufacturing Co., Ltd., the polymer was dissolved in a titrant solution prepared by mixing toluene and acetone (2:1), and the resulting solution was subjected to titration with a 01N potassium hydroxide/ethanol solution by a potentiometric titration method until reaching an end point of the titration observed as an inflection point of the titration curve. The acid value of the polymer was calculated from an amount (titer) of the potassium hydroxide solution used in the titration until reaching the end point.

(3) Measurement of Solid Content of Water Dispersion

Using an infrared moisture meter "FD-230" available from Kett Electric Laboratory, 5 g of a sample to be measured was dried at a drying temperature of 150° C. under a measuring mode 96 (monitoring time: 2.5 minutes/variation range: 0.05%), and then a water content (%) of the sample to be measured was measured to calculate a solid content thereof according to the following formula.

Solid Content (%)=100−Water Content (%) of Sample to be Measured (4) Measurement of Average Particle Size of Pigment-Containing Polymer Particles The particles were subjected to cumulant analysis using a laser particle analyzing system "ELS-8000" available from Otsuka Electrics Co., Ltd., to measure an average particle size thereof. In the measurement, there was used a dispersion diluted with water such that a concentration of the particles to be measured in the dispersion was adjusted to about $5 \times 10^{-3}$% by weight. The measurement was conducted under the conditions including a temperature of 25° C., an angle between incident light and detector of 90° and a cumulative number of 100 times, and a refractive index of water (1.333) was input to the analyzing system as a refractive index of the dispersing medium. The thus measured cumulant average particle size was defined as respective average particle sizes of the pigment-containing polymer particles and the polymer particles.

(5) Measurement of Water Solubility Rate of Epoxy Compound

A glass tube (25 mmφ in diameter×250 mm in height) was charged with 90 parts of ion-exchanged water and 10 parts of an epoxy compound at room temperature (25° C.). The glass tube thus charged was allowed to stand for 1 hour in a thermostatic bath adjusted to a water temperature of 25° C. Next, the contents of the glass tube were vigorously shaken for 1 minute, and then the glass tube was placed again in the thermostatic bath, followed by allowing the glass tube to stand in the thermostatic bath for 12 hours. Then, undissolved components in the glass tube were separated and dried, and a mass of the dried product was measured to calculate a water solubility rate (% by mass) of the epoxy compound.

(6) Measurement of Epoxy Equivalent of Epoxy Compound

The epoxy equivalent of the epoxy compound was measured by a potentiometric titration method using an automatic potentiometric titrator "AT-610" available from Kyoto Electronics Manufacturing Co., Ltd., according to JIS K7236.

Preparation Example A1

In a glass container, 25 parts of a styrene-acrylic resin "JONCRYL 690" (weight-average molecular weight: 16500; acid value: 240 mgKOH/g) as a carboxy group-containing resin available from BASF AG, and 78.6 parts of methyl ethyl ketone available from FUJIFILM Wako Pure Chemical Corporation were mixed with each other. Then, a 5N sodium hydroxide aqueous solution available from FUJIFILM Wako Pure Chemical Corporation was added to the resulting mixture to neutralize the resin such that a ratio of the number of moles of sodium hydroxide to the number of moles of the carboxy groups of the aforementioned resin was 60% (neutralization degree: 60%). Furthermore, 400 parts of ion-exchanged water were added to the mixture, and then 75 parts of a black pigment: carbon black "MONARCH 717" available from Cabot Corporation were added thereto, thereby obtaining a pigment mixture. The thus obtained pigment mixture was stirred at 20° C. for 60 minutes using a disper "ULTRA DISPER" (tradename) available from Asada Iron Works Co., Ltd., while operating a diaper blade thereof at a rotating speed of 7000 rpm. The resulting dispersion was subjected to dispersion treatment using "Ultra Apex Mill UAM-05 Model" available from HIROSHIMA METAL & MACHINERY Co., Ltd., packed with zirconia beads "YTZ Ball" having a bead diameter of 0.05 mm available from Nikkato Corporation at a packing rate of 85% while operating the mill at a rotating speed of 2350 rpm for 1 hour. At this time, an inside of the container was controlled to a temperature of from 10 to 15° C.

After the elapse of 1 hour, the contents of the container were maintained at 60° C. under reduced pressure using a rotary evaporator to completely remove methyl ethyl ketone therefrom, followed by further removing a part of water therefrom to measure a solid content thereof. The resulting dispersion was mixed with ion-exchanged water to adjust a solid content thereof to 20%, and 100 parts of the thus obtained water dispersion (solid content: 20%) was charged into a threaded neck glass bottle, and then the glass bottle was further charged with 1.08 parts of trimethylolpropane polyglycidyl ether "DENACOL EX-321" (water solubility rate: 27%; epoxy equivalent: 140) as a crosslinking agent available from Nagase ChemteX Corporation, and hermetically sealed with a cap. The contents of the glass bottle were heated at 70° C. for 5 hours while stirring with a stirrer. After the elapse of 5 hours, the contents of the glass bottle were cooled to room temperature, and then subjected to filtration treatment using a 25 mL-capacity needleless syringe available from Terumo Corporation fitted with a 5 μm-pore size filter (acetyl cellulose membrane; outer diameter: 2.5 cm) available from FUJIFILM Wako Pure Chemical Corporation, followed by adding ion-exchanged water to the resulting filtered product to adjust a solid content thereof to 20%, thereby obtaining a pigment water dispersion 1.

Preparation Example A2

The same procedure as in Preparation Example A1 was repeated except that 75 parts of the black pigment used therein was replaced with 75 parts of a cyan pigment C.I. Pigment Blue 15:3 "CFB6338JC" available from Dainichiseika Color & Chemicals Mfg. Co., Ltd., thereby obtaining a pigment water dispersion 2.

Preparation Example A3

The same procedure as in Preparation Example A1 was repeated except that 75 parts of the black pigment used therein was replaced with 75 parts of a magenta pigment C.I. Pigment Red 122 "CFR-6114JC" available from Dainichiseika Color & Chemicals Mfg. Co., Ltd., thereby obtaining a pigment water dispersion 3.

Preparation Example A4

The same procedure as in Preparation Example A1 was repeated except that 75 parts of the black pigment used therein was replaced with 75 parts of a yellow pigment C.I. Pigment Yellow 74 "FY-7414" available from Sanyo Color Works, Ltd., thereby obtaining a pigment water dispersion 4.

Preparation Example A5

The same procedure as in Preparation Example A1 was repeated except that 75 parts of the black pigment used therein was replaced with 75 parts of a red pigment C.I. Pigment Red 254 "Irgazin Red D 3656 HD" available from BASF AG, thereby obtaining a pigment water dispersion 5.

Preparation Example A6

The same procedure as in Preparation Example A1 was repeated except that 75 parts of the black pigment used therein was replaced with 75 parts of a blue pigment C.I. Pigment Blue 60 "Paliogen Blue L6482" available from BASF AG, thereby obtaining a pigment water dispersion 6. The results are shown in Table 1.

TABLE 1

| | | Vinyl polymer | | Average particle size (nm) |
|---|---|---|---|---|
| | Pigment water dispersion | Kind | Acid value (mgKOH/g) | Pigment | |
| Preparation Example A1 | Water dispersion 1 | "JONCRYL 690" | 240 | Carbon black "MONARCH 717" available from Cabot Corporation | 97 |
| Preparation Example A2 | Water dispersion 2 | "JONCRYL 690" | 240 | C.I. Pigment Blue 15:3 "CFB6338JC" available from Dainichiseika Color & Chemicals Mfg. Co., Ltd. | 112 |
| Preparation Example A3 | Water dispersion 3 | "JONCRYL 690" | 240 | C.I. Pigment Red 122 "CFR-6114JC" available from Dainichiseika Color & Chemicals Mfg. Co., Ltd. | 108 |
| Preparation Example A4 | Water dispersion 4 | "JONCRYL 690" | 240 | C.I. Pigment Yellow 74 "FY7414" available from Sanyo Color Works, Ltd. | 111 |
| Preparation Example A5 | Water dispersion 5 | "JONCRYL 690" | 240 | C.I. Pigment Red 254 "Irgazin Red D 3656 HD" available from BASF AG | 122 |
| Preparation Example A6 | Water dispersion 6 | "JONCRYL 690" | 240 | C.I. Pigment Blue 60 "Paliogen Blue L6482" available from BASF AG | 96 |

Preparation Examples B1 to B7 (Preparation of Water-Based Inks 1 to 7)

The respective pigment water dispersions 1 to 6 obtained in Preparation Examples A1 to A6, the commercially available pigment water dispersion, the organic solvents, the surfactant and ion-exchanged water were compounded with each other in the amounts shown in Table 2 (such that a total amount of these components was 100%), thereby obtaining water-based inks 1 to 7. Incidentally, the amounts of the respective pigment water dispersions compounded as shown in Table 2 were expressed in terms of solid contents thereof.

under atmospheric pressure: 89° C.), in which the particles contained in the emulsion had an average particle size of 43 nm.

The emulsion C was a sodium hydroxide-neutralized product (solid content: 20%) obtained by neutralizing 60 mol % of an acid value of the resin with sodium hydroxide

TABLE 2

| | | | No. of water-based ink | | | | | | |
|---|---|---|---|---|---|---|---|---|---|
| | | | 1 | 2 | 3 | 4 | 5 | 6 | 7 |
| Composition of water-based ink (%) | Pigment water dispersion | Water dispersion 1 (black) | 10 | — | — | — | — | — | — |
| | | Water dispersion 2 (cyan) | — | 10 | — | — | — | — | — |
| | | Water dispersion 3 (magenta) | — | — | 10 | — | — | — | — |
| | | Water dispersion 4 (yellow) | — | — | — | 10 | — | — | — |
| | | Water dispersion 5 (red) | — | — | — | — | 10 | — | — |
| | | Water dispersion 6 (blue) | — | — | — | — | — | 10 | — |
| | | SDP100 (black) | — | — | — | — | — | — | 10 |
| | Organic solvent: PG | | 30 | 30 | 30 | 30 | 30 | 30 | 30 |
| | Organic solvent: BDG | | 5 | 5 | 5 | 5 | 5 | 5 | 5 |
| | Surfactant: KF6011 | | 0.5 | 0.5 | 0.5 | 0.5 | 0.5 | 0.5 | 0.5 |
| | Ion-exchanged water | | Balance | Balance | Balance | Balance | Balance | Balance | Balance |

The details of the pigment water dispersions, the organic solvents and the surfactant shown in Table 2 are as follows.
SDP100: Water dispersion of a self-dispersible carbon black "SENSIJET BLACK SDP100" available from Sensient Technologies Corporation
PG: Propylene glycol available from FUJIFILM Wako Pure Chemical Corporation
BDG: Diethylene glycol monobutyl ether available from FUJIFILM Wako Pure Chemical Corporation
KF6011: Alkylene glycol-modified polydimethylsiloxane "KF-6011" (tradename; nonionic surfactant) available from Shin-Etsu Chemical Co., Ltd.

Preparation Example B8 (Preparation of Water-Based Ink 8)

A cyan dye ink "XKI-N11XLC" commercially available from Cannon Inc., was used as a water-based ink 8.

Preparation Examples C1 to C4 (Preparation of Pigment-Free Vinyl Polymer Emulsions a to D)

A four-necked flask equipped with a nitrogen inlet tube, a reflux condenser, a stirrer and a thermocouple was charged with 25 parts of a styrene-acrylic resin "JONCRYL 690" (weight-average molecular weight: 16500; acid value: 240 mgKOH/g) available from BASF AG, and 100 parts of ion-exchanged water. Next, a 25% ammonia aqueous solution available from FUJIFILM Wako Pure Chemical Corporation, triethylamine available from FUJIFILM Wako Pure Chemical Corporation or a 5N sodium hydroxide aqueous solution available from FUJIFILM Wako Pure Chemical Corporation was added as the neutralizing agent to the flask, and the contents of the flask were stirred at 70° C. for 5 hours and then cooled to 25° C., thereby obtaining a pigment-free emulsion or a pigment-free aqueous solution of "Joncryl 690".

The resulting emulsion or aqueous solution was subjected to filtration treatment through a 200-mesh wire screen, thereby obtaining pigment-free emulsions A to C of "Joncryl 690" and a pigment-free aqueous solution D of "Joncryl 690".

The emulsion A was an ammonia-neutralized product (solid content: 20%) obtained by neutralizing 60 mol % of an acid value of the resin with ammonia (boiling point under atmospheric pressure: −33.3° C.), in which the particles contained in the emulsion had an average particle size of 32 nm.

The emulsion B was a triethylamine-neutralized product (solid content: 20%) obtained by neutralizing 60 mol % of an acid value of the resin with triethylamine (boiling point under atmospheric pressure: 1388° C.), in which the particles contained in the emulsion had an average particle size of 25 nm.

The aqueous solution D was an ammonia-neutralized product (solid content: 20%) obtained by neutralizing 100 mol % of an acid value of the resin with ammonia, and was in the form of a transparent aqueous solution in which the resin was completely dissolved.

Preparation Example C5 (Preparation of Pigment-Free Crosslinked Vinyl Polymer Emulsion E)

One hundred parts of the aforementioned emulsion B were mixed with 5 parts of trimethylolpropane polyglycidyl ether "DENACOL EX-321" (molecular weight: 302; epoxy value: 140; water solubility rate: 27%) as a crosslinking agent available from Nagase ChemteX Corporation. The resulting mixture was heated at 70° C. for 5 hours while stirring with a stirrer. After being cooled to 25° C., the resulting reaction solution was subjected to filtration treatment through a 200-mesh wire screen, thereby obtaining a pigment-free crosslinked vinyl polymer emulsion E (solid content: 20%).

Examples A1 to A4 and Comparative Examples A1 to A4 (Production of Aqueous Compositions 1 to 8)

The respective carbodiimide compounds, the respective emulsions or aqueous solution of "JONCRYL 690" obtained in Preparation Examples C1 to C5, the organic solvent, the surfactant and ion-exchanged water as shown in Table 3 were compounded with each other in the amounts shown in Table 3 (such that a total amount of these components was 100%), thereby obtaining aqueous compositions 1 to 8.

Incidentally, the amounts of the carbodiimide compounds, and the emulsions or aqueous solution of "JONCRYL 690" compounded as shown in Table 3 were expressed in terms of solid contents of the respective components.

TABLE 3

|  |  | Examples | | | | Comparative Examples | | | |
|---|---|---|---|---|---|---|---|---|---|
|  |  | A1 | A2 | A3 | A4 | A1 | A2 | A3 | A4 |
| No. of aqueous composition | | 1 | 2 | 3 | 4 | 5 | 6 | 7 | 8 |
| Composition (%) | CARBODILITE E-02 | 1 | — | — | — | — | — | 1 | — |
|  | CARBODILITE V-04 | — | 1 | 1 | 1 | — | 1 | — | 1 |
|  | J-690 emulsion A[*1] | 5 | 5 | — | — | 5 | — | — | — |
|  | J-690 emulsion B[*2] | — | — | 5 | — | — | — | — | — |
|  | J-690 emulsion C[*3] | — | — | — | — | — | — | 5 | — |
|  | J-690 aqueous solution D[*4] | — | — | — | — | — | — | — | 5 |
|  | J-690 emulsion E[*5] | — | — | — | 5 | — | — | — | — |
|  | Organic solvent: PG | 30 | 30 | 30 | 30 | 35 | 40 | 30 | 35 |
|  | Surfactant: KF6011 | 0.5 | 0.5 | 0.5 | 0.5 | 0.5 | 0.5 | 0.5 | 0.5 |
|  | Ion-exchanged water | Balance | Balance | Balance | Balance | Balance | Balance | Balance | Balance |
| Appearance of aqueous composition | | w.t.[*6] | w.t.[*6] | w.t.[*6] | w.t.[*6] | w.t.[*6] | w.t.[*6] | w.t.[*6] | Clear solution |

Note
[*1]"JONCRYL 690" emulsion A as a $NH_3$ 60 mol %-neutralized product;
[*2]"JONCRYL 690" emulsion B as a triethylamine 60 mol %-neutralized product;
[*3]"JONCRYL 690" emulsion C as a NaOH 60 mol %-neutralized product;
[*4]"JONCRYL 690" aqueous solution D as a $NH_3$ 100 mol %-neutralized product;
[*5]"JONCRYL 690" emulsion E as a triethylamine 60 mol %-neutralized product (crosslinked with a polyfunctional epoxy compound);
[*6]White turbidity
The details of the carbodiimide compounds, etc. shown in Table 3 are as follows.
CARBODILITE E-02: Polycarbodiimide (appearance: emulsion; carbodiimide group equivalent: 445; active ingredient content: 40%; available from Nisshinbo Chemical Inc.; tradename)
CARBODILITE V-04: Polycarbodiimide (appearance: aqueous solution; carbodiimide group equivalent: 335; active ingredient content: 40%; available from Nisshinbo Chemical Inc.; tradename)
PG: Propylene glycol available from FUJIFILM Wako Pure Chemical Corporation
KF6011: Alkylene glycol-modified polydimethylsiloxane "KF-6011" (tradename; nonionic surfactant) available from Shin-Etsu Chemical Co., Ltd.

Examples 1 to 16 and Comparative Examples 1 to 4 (Printing Operations Using Ink Sets)

Respective ink sets each constituted of a combination of the aqueous composition and the water-based ink shown in Table 4 were loaded to an ink-jet printer "IPSiO SG2010L" available from Ricoh Co., Ltd., to print a solid image having a size of 10 cm×10 cm on a polyethylene terephthalate (PET) film "LUMIRROR (registered trademark) T60" as a printing medium available from Toray Industries, Inc.

After that, the resulting printed material was dried at 60° C. for 10 minutes under ordinary pressures, and then subjected to heat treatment at 120° C. for 10 minutes. Thereafter, the printed material was allowed to stand at room temperature for 10 hours for drying, and then evaluated for rub fastness by the following method.

Incidentally, in Examples 1 to 6 and 12 to 16 and Comparative Examples 1 to 4, the two liquids including the aqueous composition and the water-based ink were loaded to the ink-jet printer, and the printing operation was conducted such that the aqueous composition and the water-based ink were separately ejected with the same droplet size from respective two ink-jet print heads of the ink-jet printer, and then both the liquids were mixed with each other on the printing medium.

In Examples 7 to 12, the aqueous composition and the water-based ink were mixed with each other at a mass ratio of 1:1 to prepare a water-based ink containing the carbodiimide compound, the polyester resin, the pigment and water, and one more water-based ink having the same composition was further prepared. The two water-based inks were loaded to the ink-jet printer, and the printing operation was conducted such that the two water-based inks were ejected with the same droplet size from respective two ink-jet print heads of the ink-jet printer.

In addition, the amount of the aqueous composition applied was from 0.2 to 1.2 g per 1 $m^2$ of the 100%-density solid image in terms of a solid content thereof, and the amount of the ink applied was from 1.0 to 2.0 g per 1 $m^2$ of the 100%-density solid image in terms of a solid content thereof.

[Evaluation of Rub Fastness]

The printed surface of the resulting printed material was rubbed with a cellulose nonwoven fabric "BEMCOT (registered trademark) M3-II" available from Asahi Kasei Fiber K.K., impregnated with 100% ethanol while applying a load of 100 g/$cm^2$ thereonto, and the conditions of the printed surface and the nonwoven fabric were visually observed to count the number of the rubbing motions until migration of the color of the ink into the cellulose nonwoven fabric occurred.

When the evaluation rating of the rub fastness (the number of rubbing motions) was not less than 4, the printed material was usable in practical applications, and when the evaluation rating of the rub fastness (the number of rubbing motions) was not less than 8, the printed material was regarded as being sufficient in rub fastness.

TABLE 4

|  | Water-based ink | Aqueous composition | Printing method | Rub fastness (number of rubbing motions) |
|---|---|---|---|---|
| Example 1 | Ink 1 (black) | Composition 1 | *2 | 14 |
| Example 2 | Ink 2 (cyan) | Composition 2 | *2 | 16 |
| Example 3 | Ink 3 (magenta) | Composition 3 | *2 | 15 |
| Example 4 | Ink 4 (yellow) | Composition 1 | *2 | 13 |
| Example 5 | Ink 5 (red) | Composition 2 | *2 | 14 |
| Example 6 | Ink 6 (blue) | Composition 3 | *2 | 12 |
| Example 7 | Ink 1 (black) | Composition 1 | *1 | 14 |
| Example 8 | Ink 2 (cyan) | Composition 2 | *1 | 15 |
| Example 9 | Ink 3 (magenta) | Composition 3 | *1 | 15 |
| Example 10 | Ink 4 (yellow) | Composition 1 | *1 | 13 |
| Example 11 | Ink 5 (red) | Composition 2 | *1 | 14 |

TABLE 4-continued

| | Water-based ink | Aqueous composition | Printing method | Rub fastness (number of rubbing motions) |
|---|---|---|---|---|
| Example 12 | Ink 6 (blue) | Composition 3 | *2 | 12 |
| Example 13 | Ink 7 (black) | Composition 2 | *2 | 16 |
| Example 14 | Ink 8 (cyan) | Composition 1 | *2 | 4 |
| Example 15 | Ink 1 (black) | Composition 4 | *2 | 21 |
| Example 16 | Ink 2 (cyan) | Composition 4 | *2 | 23 |
| Comparative Example 1 | Ink 1 (black) | Composition 5 | *2 | 1 |
| Comparative Example 2 | Ink 1 (black) | Composition 6 | *2 | 1 |
| Comparative Example 3 | Ink 1 (black) | Composition 7 | *2 | 2 |
| Comparative Example 4 | Ink 1 (black) | Composition 8 | *2 | 3 |

Note
*1: The water-based ink and the aqueous composition were previously mixed with each other at a mass ratio of 1:1, and loaded to a printer as one mixed liquid, and then the liquid was ejected from a print head for conducting the printing.
*2: The water-based ink and the aqueous composition were respectively loaded to separate print heads of a printer, and separately ejected therefrom for conducting the printing.

From the results shown in Table 4, it was confirmed that according to the aqueous composition, the ink set and the ink-jet printing method using the carbodiimide compound and the vinyl polymer whose carboxy groups were partially neutralized with the basic compound having a boiling point of not higher than 130° C., it was possible to obtain the printed material that was excellent in rub fastness. On the other hand, it was confirmed that in the Comparative Example 1 using the aqueous composition 5 containing no carbodiimide compound, in the Comparative Example 2 using the aqueous composition 6 containing the vinyl polymer whose carboxy groups were not partially neutralized, in the Comparative Example 3 using the aqueous composition 7 containing the vinyl polymer whose carboxy groups were partially neutralized with the basic compound having a boiling point of higher than 130° C., and in the Comparative Example 4 using the aqueous composition 8 in which the vinyl polymer was dissolved, it was not possible to obtain a printed material having excellent rub fastness.

INDUSTRIAL APPLICABILITY

According to the ink set and the ink-jet printing method using the aqueous composition of the present invention, it is possible to obtain a printed material that is excellent in rub fastness even when characters or images are printed on a non-water absorbing printing medium or a shrinkable printing medium.

The invention claimed is:

1. An aqueous composition for ink-jet printing, comprising a carbodiimide compound, a vinyl polymer and water, in which the vinyl polymer comprises carboxy groups, and is dispersed in the aqueous composition in the form of polymer particles formed by partially neutralizing the carboxy groups with a basic compound having a boiling point of not higher than 130° C. as measured under atmospheric pressure, and the vinyl polymer is a pigment-free water-insoluble polymer crosslinked with a polyfunctional epoxy compound.

2. The aqueous composition for ink-jet printing according to claim 1, wherein a content of the vinyl polymer in the aqueous composition is not less than 0.5% by mass and not more than 35% by mass.

3. The aqueous composition for ink-jet printing according to claim 1, wherein a mass ratio of the carbodiimide compound to the vinyl polymer (carbodiimide compound/vinyl polymer) is not less than 0.01 and not more than 1.0.

4. The aqueous composition for ink-jet printing according to claim 1, wherein the vinyl polymer comprises a constitutional unit derived from an ionic monomer and a constitutional unit derived from a hydrophobic monomer.

5. The aqueous composition for ink-jet printing according to claim 4, wherein the hydrophobic monomer is at least one monomer selected from the group consisting of an alkyl (meth)acrylate, an aromatic group-containing monomer and a macromonomer.

6. The aqueous composition for ink-jet printing according to claim 1, wherein the polyfunctional epoxy compound is a water-insoluble polyfunctional epoxy compound.

7. An ink set for ink-jet printing, comprising an aqueous composition a comprising a carbodiimide compound, a vinyl polymer, and water, and an aqueous composition b comprising a pigment and a vinyl polymer, the aqueous composition b being a water-based ink,
in which the vinyl polymer comprised in the aqueous composition a comprises carboxy groups, and is dispersed in the aqueous composition in the form of polymer particles formed by partially neutralizing the carboxy groups with a basic compound having a boiling point of not higher than 130° C. as measured under atmospheric pressure, and is a pigment-free water-insoluble polymer crosslinked with a polyfunctional epoxy compound, and
in the aqueous composition a, a mass ratio of the carbodiimide compound to the vinyl polymer (carbodiimide compound/vinyl polymer) is not less than 0.01 and not more than 1.0.

8. The ink set for ink-jet printing according to claim 7, wherein the water-based ink has two or more hues.

9. An ink-jet printing method comprising the following steps 1 and 2:
Step 1: ejecting a carbodiimide compound, a pigment, a vinyl polymer and water onto a surface of a printing medium by an ink-jetting method to print characters or images thereon, said vinyl polymer comprising carboxy groups, and being dispersed in an aqueous composition in the form of polymer particles formed by partially neutralizing the carboxy groups with a basic compound having a boiling point of not higher than 130° C. as measured under atmospheric pressure, and being a pigment-free water-insoluble polymer crosslinked with a polyfunctional epoxy compound,
the pigment is present in the form of pigment-containing polymer particles, and the polymer constituting the pigment-containing polymer particles is a polymer crosslinked with a polyfunctional epoxy compound; and
Step 2: subjecting the characters or images printed in the step 1 to heat treatment at a temperature of not lower than 50° C. and not higher than 200° C.

10. The aqueous composition for ink-jet printing according to claim 1, wherein the neutralization degree of the carboxy groups of the vinyl polymer is not less than 30 mol % and not more than 75 mol %.

11. The ink set for ink-jet printing according to claim 7, wherein the neutralization degree of the carboxy groups of the vinyl polymer is not less than 30 mol % and not more than 75 mol %.

12. The ink-jet printing method according to claim 9, wherein the neutralization degree of the carboxy groups of the vinyl polymer is not less than 30 mol % and not more than 75 mol %.

* * * * *